(12) United States Patent
Mitsumoto et al.

(10) Patent No.: US 11,156,697 B2
(45) Date of Patent: Oct. 26, 2021

(54) RADAR SIGNAL PROCESSING DEVICE AND RADAR SYSTEM

(71) Applicant: Mitsubishi Electric Corporation, Tokyo (JP)

(72) Inventors: Masashi Mitsumoto, Tokyo (JP); Toru Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 254 days.

(21) Appl. No.: 16/477,597

(22) PCT Filed: Feb. 24, 2017

(86) PCT No.: PCT/JP2017/007106
§ 371 (c)(1),
(2) Date: Jul. 12, 2019

(87) PCT Pub. No.: WO2018/154710
PCT Pub. Date: Aug. 30, 2018

(65) Prior Publication Data
US 2019/0369208 A1    Dec. 5, 2019

(51) Int. Cl.
*G01S 7/35* (2006.01)
*G01S 13/58* (2006.01)

(52) U.S. Cl.
CPC .......... *G01S 7/352* (2013.01); *G01S 13/584* (2013.01); *G01S 7/356* (2021.05)

(58) Field of Classification Search
CPC ......... G01S 7/352; G01S 13/584; G01S 7/356
(Continued)

(56) References Cited

U.S. PATENT DOCUMENTS 5,534,992 A * 7/1996 Takeshima ............ G01S 7/4818
356/5.09
5,694,130 A * 12/1997 Suzuki .................. G01S 13/931
342/70
(Continued)

FOREIGN PATENT DOCUMENTS

| JP | 2014106120 A | * | 6/2014 | ............ G01S 7/354 |
|---|---|---|---|---|
| JP | 2016-003873 A | | 1/2016 | |
| WO | 2013/156012 A1 | | 10/2013 | |

OTHER PUBLICATIONS

International Search Report for PCT/JP2017/007106, dated May 30, 2017.

*Primary Examiner* — Bernarr E Gregory
*Assistant Examiner* — Nuzhat Pervin
(74) *Attorney, Agent, or Firm* — Sughrue Mion, PLLC; Richard C. Turner

(57) ABSTRACT

First voltage data ($V1_1$ to $V1_n$) and second voltage data ($V2_1$ to $V2_n$) each correspond to ranges of the same transmitted signals ($T_1$ to $T_n$) that have different modulation center frequencies. A speed calculating unit (50) calculates a moving speed of a radio-wave-reflecting object by calculating a reference speed (Sref) which is based on a difference value between the modulation center frequency (Fc_1) of the range of the transmitted signals ($T_1$ to $T_n$) corresponding to the first voltage data ($V1_1$ to $V1_n$) and the modulation center frequency (Fc_2) of the range of the transmitted signals ($T_1$ to $T_n$) corresponding to the second voltage data ($V2_1$ to $V2_n$), and comparing a plurality of speed candidates (Scand [m]) with the reference speed (Sref).

8 Claims, 18 Drawing Sheets

(58) Field of Classification Search
USPC .......................................................... 342/107
See application file for complete search history.

(56) References Cited

U.S. PATENT DOCUMENTS

| | | | | |
|---|---|---|---|---|
| 6,674,393 | B2* | 1/2004 | Kishida | G01S 13/345 |
| | | | | 342/70 |
| 8,004,327 | B2* | 8/2011 | Hongo | G01S 7/4008 |
| | | | | 327/156 |
| 8,620,600 | B2* | 12/2013 | Vock | G01L 1/00 |
| | | | | 702/44 |
| 9,149,577 | B2* | 10/2015 | Robertson | A61B 5/0028 |
| 2002/0190893 | A1* | 12/2002 | Akasu | G01S 13/347 |
| | | | | 342/70 |
| 2003/0128156 | A1* | 7/2003 | Kishida | G01S 7/352 |
| | | | | 342/195 |
| 2006/0214839 | A1* | 9/2006 | Mitsumoto | G01S 5/0226 |
| | | | | 342/70 |
| 2010/0213993 | A1* | 8/2010 | Hongo | G01S 7/4008 |
| | | | | 327/156 |
| 2015/0084806 | A1* | 3/2015 | Rohling | G01S 13/345 |
| | | | | 342/109 |
| 2017/0115386 | A1* | 4/2017 | Morinaga | G01S 13/53 |

\* cited by examiner

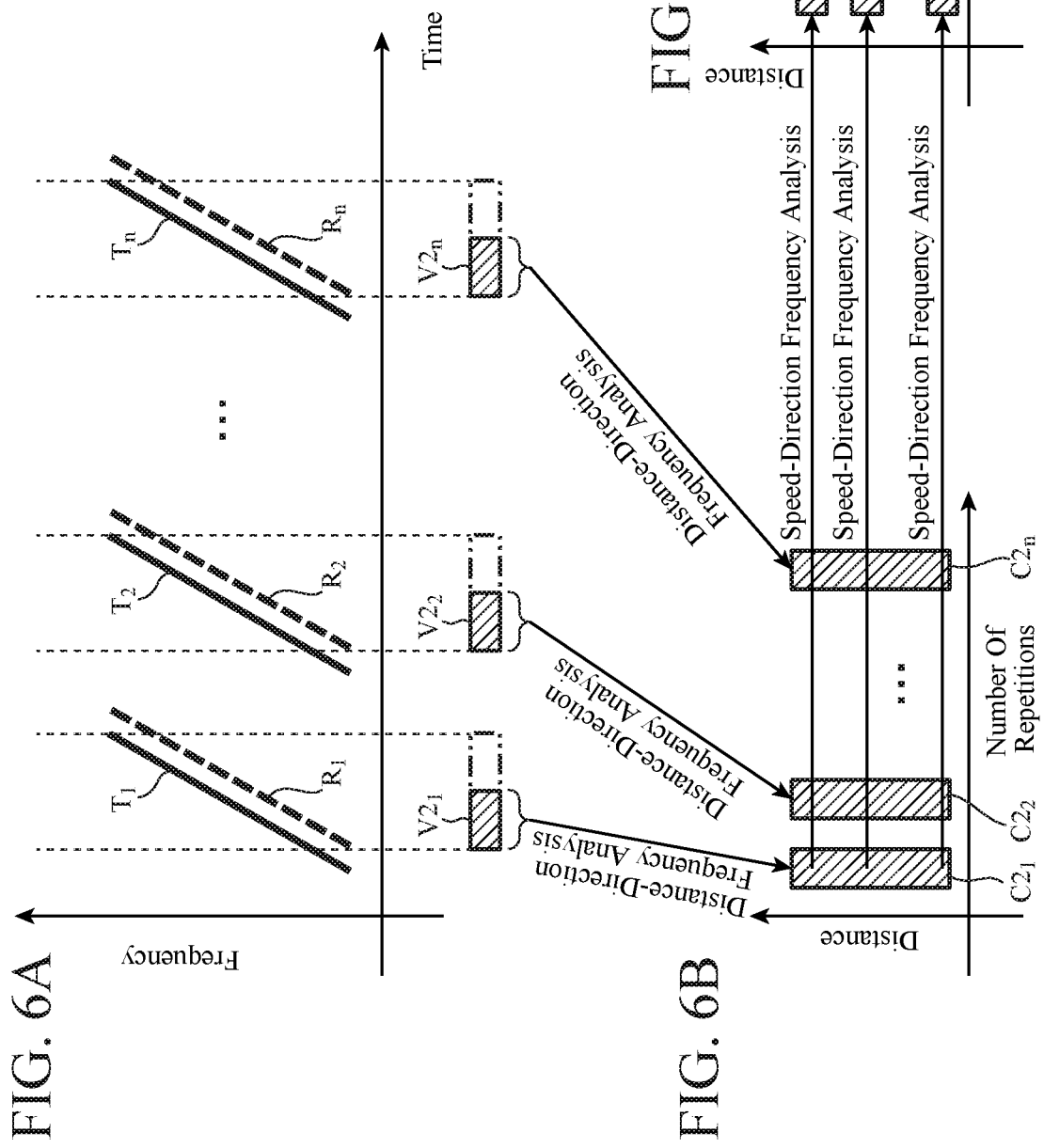

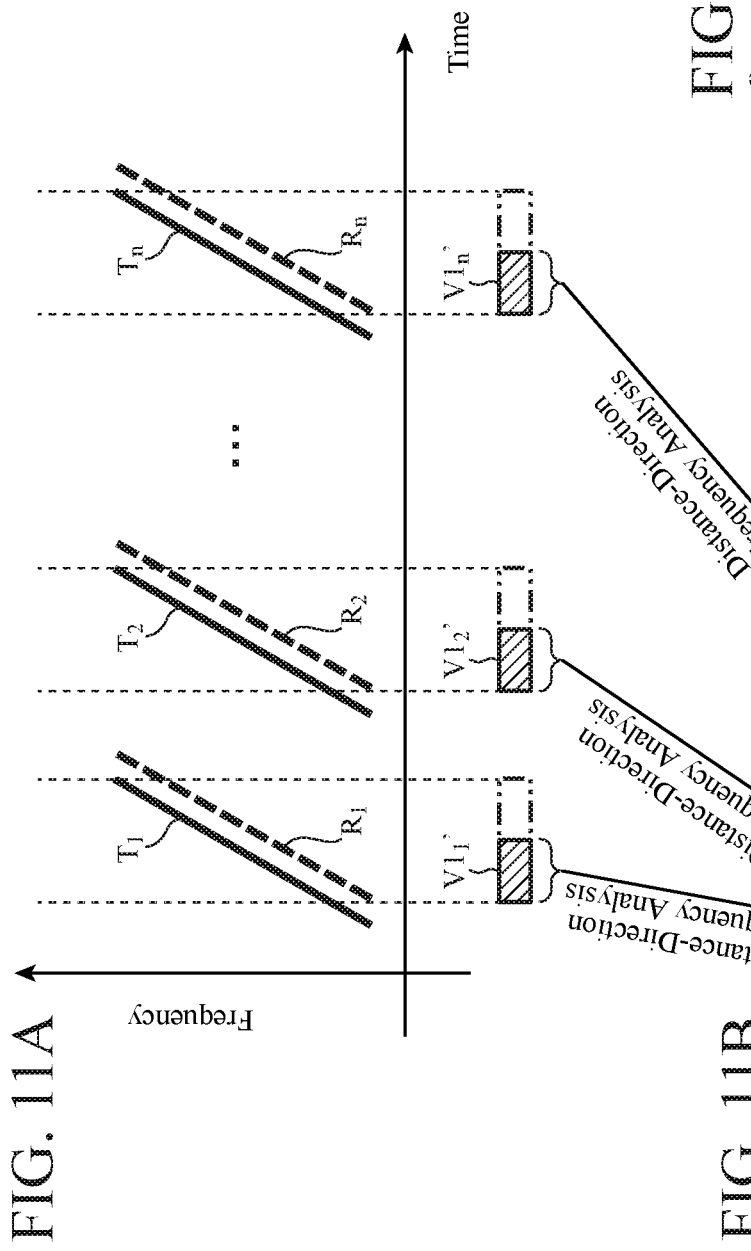

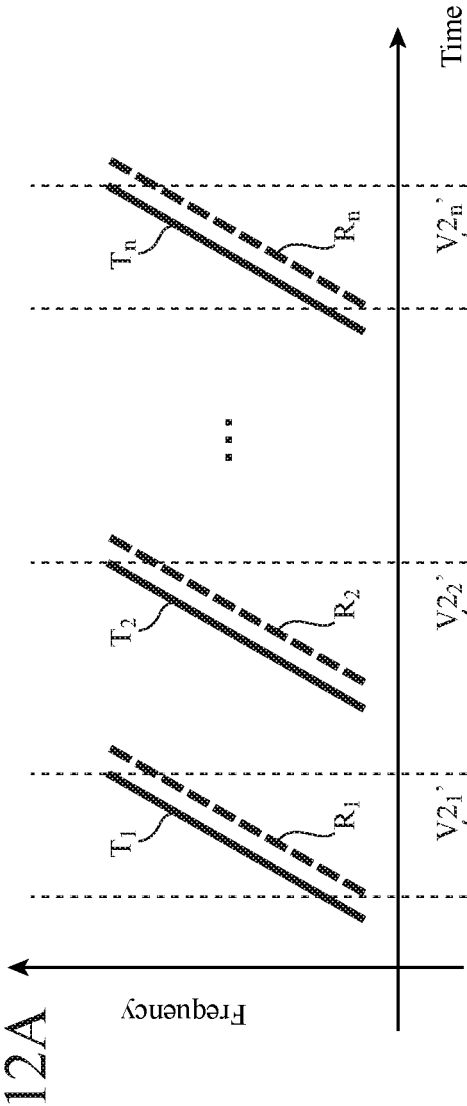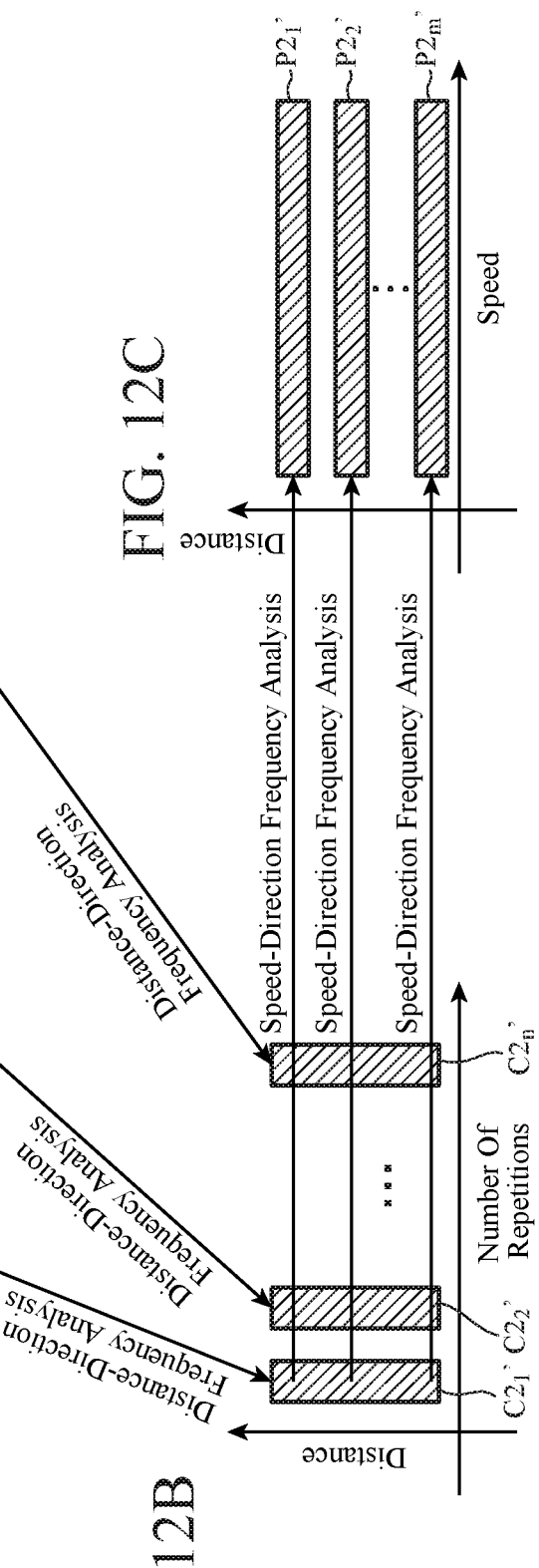
FIG. 12A
FIG. 12B
FIG. 12C

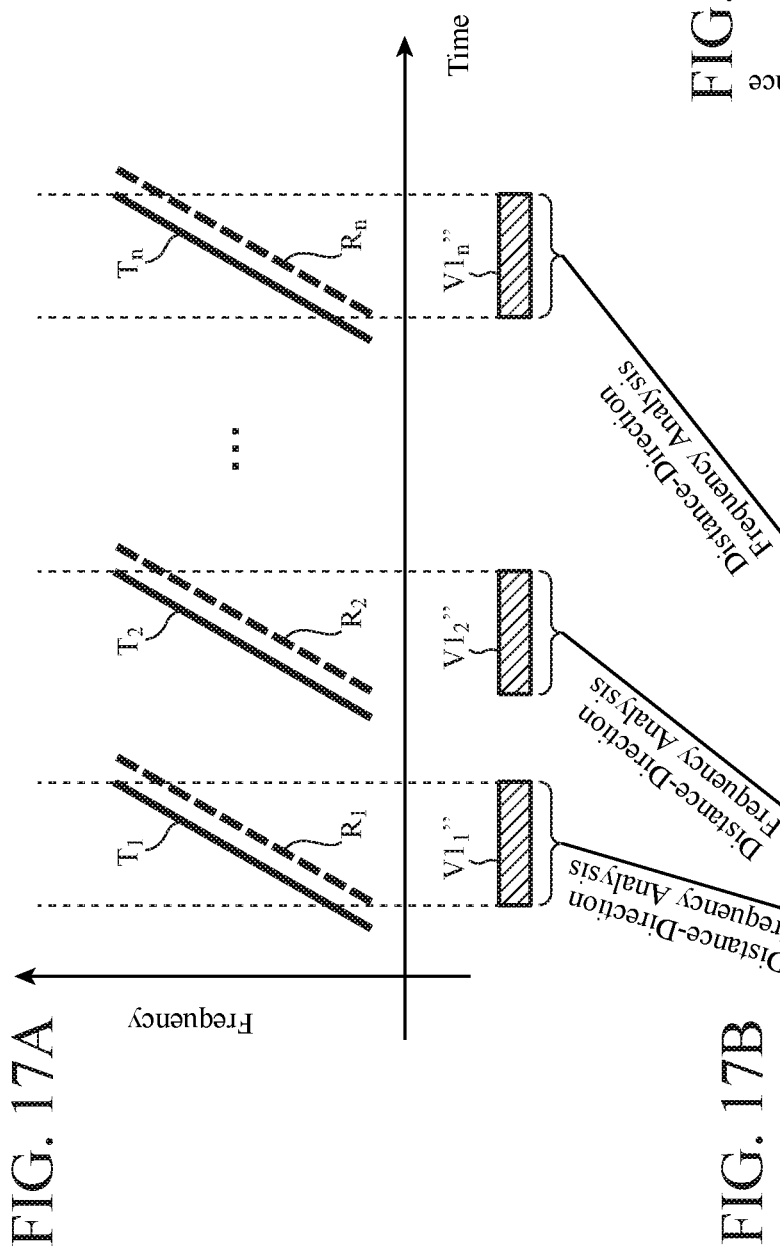
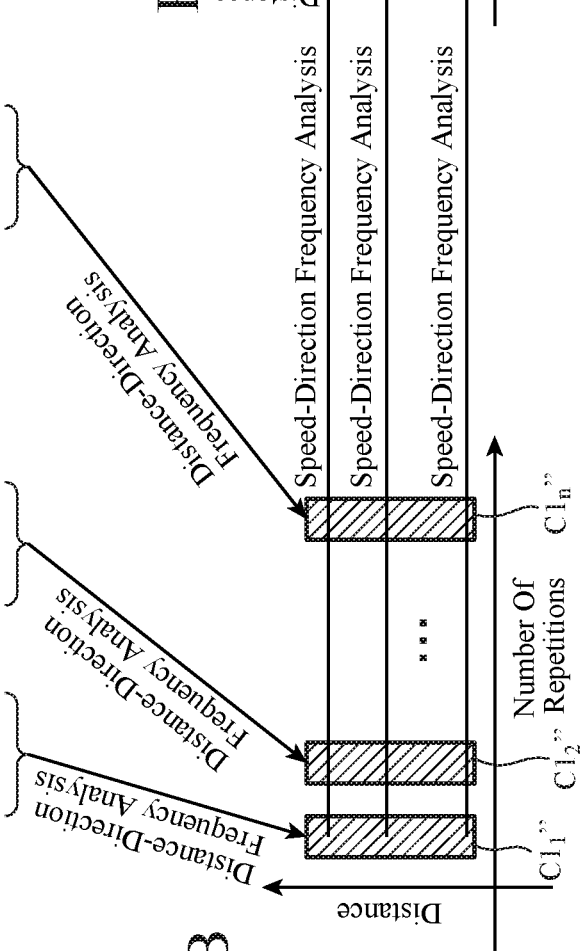
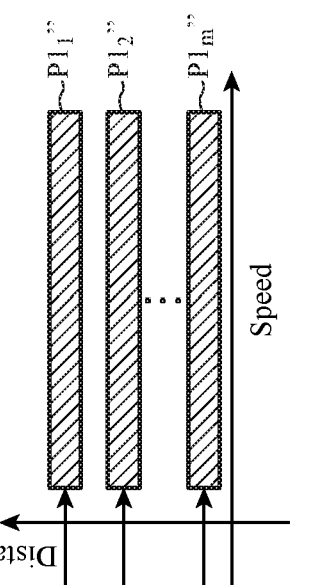
FIG. 17A
FIG. 17B
FIG. 17C

RADAR SIGNAL PROCESSING DEVICE AND RADAR SYSTEM

CROSS REFERENCE TO RELATED APPLICATIONS

This application is a National Stage of International Application No. PCT/JP2017/007106 filed Feb. 24, 2017.

TECHNICAL FIELD

The present invention relates to a radar signal processing device and a radar system.

BACKGROUND ART

Conventionally, there is developed a radar system that measures a distance to an object (which may be hereinafter simply referred to as a "distance") and a relative moving speed to the object (which may be hereinafter simply referred to as a "moving speed of the object" or "speed"), using signals whose frequencies linearly rise or fall over time (so-called "chirp signals"), as transmitted signals. The radar system generates beat signals by mixing the transmitted signals with received signals, converts the beat signals into frequency complex spectra by frequency analysis in a distance direction, converts the frequency complex spectra into two-dimensional frequency power spectra by frequency analysis in a speed direction, detects peaks of the two-dimensional frequency power spectra, calculates a distance from frequencies in the distance direction corresponding to the peaks, and calculates speed from frequencies in the speed direction corresponding to the peaks.

In the radar system using chirp signals as transmitted signals, the shorter the repetition period of the chirp signals, the higher the folding frequency of frequencies in the speed direction, and thus, ambiguity is eliminated and the range of measurable speed increases. However, when the repetition period cannot be reduced due to the constraints of a transmission system, particularly, constraints such as the characteristics of a high-frequency circuit in a frequency band of radio waves to be transmitted, if the moving speed of the object increases, then spectrum folding occurs at frequencies in the speed direction, and thus, ambiguity in speed measurement occurs.

On the other hand, a radar system of Patent Literature 1 includes means (first processing means) for measuring speed by a method in which the accuracy is high but ambiguity occurs; and means (second processing means) for measuring speed by a method in which the accuracy is low but ambiguity does not occur. The radar system of Patent Literature 1 eliminates ambiguity by combining those methods.

In addition, a radar system of Patent Literature 2 generates two types of chirp signals whose frequency ranges slightly differ from each other, and alternately transmits radio waves corresponding to the respective chirp signals. The radar system of Patent Literature 2 eliminates ambiguity in speed measurement by using information on a phase difference which is obtained from results of observation of those radio waves.

CITATION LIST

Patent Literatures

Patent Literature 1: JP 2016-3873 A
Patent Literature 2: WO 2013/156012 A

SUMMARY OF INVENTION

Technical Problem

The radar system of Patent Literature 1 measures speed by two different types of methods. Therefore, there is a need to transmit and receive radio waves appropriate for each method and perform frequency analysis, etc., appropriate for each method. Hence, there is a problem that it takes time to obtain a final measurement result.

The radar system of Patent Literature 2 uses two types of chirp signals whose frequency ranges slightly differ from each other. Therefore, there is a problem that in terms of securing the accuracy of the frequency ranges of radio waves corresponding to the respective chirp signals, there is a need to add a frequency compensation circuit for high frequencies, etc.

The present invention is made to solve problems such as those described above, and an object of the present invention is to provide a radar signal processing device and a radar system that are capable of eliminating ambiguity in speed measurement while an increase in the time required to measure speed is avoided and the need for an additional circuit such as a frequency compensation circuit is eliminated.

Solution to Problem

A radar signal processing device of the present invention is a radar signal processing device that measures a moving speed of an object using voltage data obtained by mixing transmitted signals with received signals, the transmitted signals being chirp signals, the received signals corresponding to reflected waves of radio waves corresponding to the transmitted signals, and the object having reflected the radio waves, and includes a first frequency analyzing unit for performing frequency analysis on first voltage data among the voltage data; a second frequency analyzing unit for performing frequency analysis on second voltage data among the voltage data; and a speed calculating unit for calculating the moving speed of the object using results of the frequency analysis performed by the first frequency analyzing unit and results of the frequency analysis performed by the second frequency analyzing unit, and wherein the first voltage data and the second voltage data each correspond to ranges of each transmitted signal that have different modulation center frequencies, and the speed calculating unit calculates the moving speed of the object by calculating a reference speed and comparing a plurality of speed candidates with the reference speed, the reference speed being based on a difference value between the modulation center frequency of the range corresponding to the first voltage data and the modulation center frequency of the range corresponding to the second voltage data.

Advantageous Effects of Invention

According to the present invention, since a configuration is formed in the above-described manner, ambiguity in speed measurement can be eliminated while an increase in the time required to measure speed is avoided and the need for an additional circuit such as a frequency compensation circuit is eliminated.

BRIEF DESCRIPTION OF DRAWINGS

FIG. 6A is an illustrative diagram showing the waveforms of the transmitted signals, the waveforms of the received signals, and second voltage data according to the first embodiment of the present invention, FIG. 6B is an illustrative diagram showing complex spectra into which the second voltage data shown in FIG. 6A are converted, and FIG. 6C is an illustrative diagram showing power spectra into which the complex spectra shown in FIG. 6B are converted.

FIG. 11A is an illustrative diagram showing the waveforms of transmitted signals, the waveforms of received signals, and first voltage data according to the second embodiment of the present invention, FIG. 11B is an illustrative diagram showing complex spectra into which the first voltage data shown in FIG. 11A are converted, and FIG. 11C is an illustrative diagram showing power spectra into which the complex spectra shown in FIG. 11B are converted.

FIG. 12A is an illustrative diagram showing the waveforms of the transmitted signals, the waveforms of the received signals, and second voltage data according to the second embodiment of the present invention, FIG. 12B is an illustrative diagram showing complex spectra into which the second voltage data shown in FIG. 12A are converted, and FIG. 12C is an illustrative diagram showing power spectra into which the complex spectra shown in FIG. 12B are converted.

FIG. 17A is an illustrative diagram showing the waveforms of transmitted signals, the waveforms of received signals, and first voltage data according to the third embodiment of the present invention, FIG. 17B is an illustrative diagram showing complex spectra into which the first voltage data shown in FIG. 17A are converted, and FIG. 17C is an illustrative diagram showing power spectra into which the complex spectra shown in FIG. 17B are converted.

DESCRIPTION OF EMBODIMENTS

To describe the invention in more detail, modes for carrying out the invention will be described below with reference to the accompanying drawings.

First Embodiment

Figure 1:
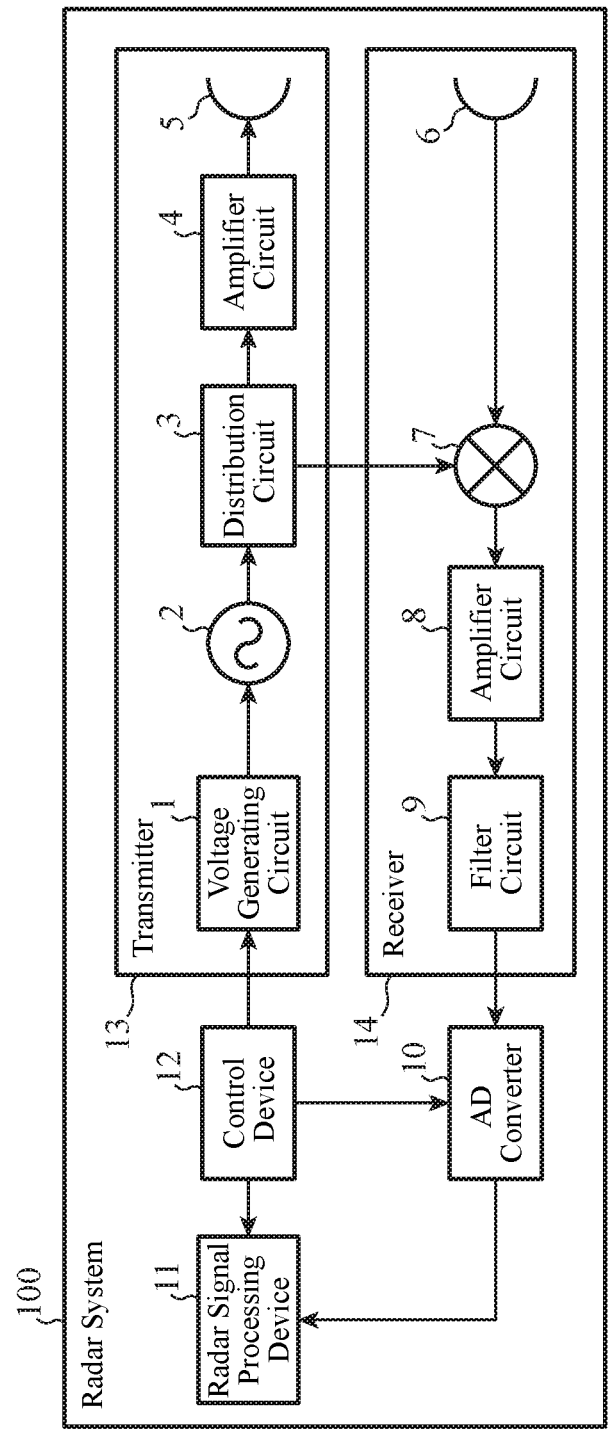
FIG. 1 is a system configuration diagram showing the main part of a radar system according to a first embodiment of the present invention.

FIG. 1 is a system configuration diagram showing the main part of a radar system according to a first embodiment of the present invention. With reference to FIG. 1, a radar system 100 of the first embodiment will be described.

A voltage generating circuit 1 generates a predetermined voltage and outputs the generated voltage to a voltage controlled oscillator 2. The voltage controlled oscillator 2 generates a signal with a frequency determined on the basis of the voltage inputted from the voltage generating circuit 1, and outputs the generated signal (hereinafter, referred to as a "transmitted signal") to a distribution circuit 3. Here, by the output voltage from the voltage generating circuit 1 changing over time, the frequency of the transmitted signal linearly rises or falls over time. Namely, the voltage generating circuit 1 and the voltage controlled oscillator 2 convert the transmitted signal into a chirp signal by modulating the transmitted signal.

The distribution circuit 3 distributes and outputs the transmitted signal inputted from the voltage controlled oscillator 2, to an amplifier circuit 4 and a mixer 7. The amplifier circuit 4 amplifies the transmitted signal inputted from the distribution circuit 3, and outputs the amplified transmitted signal to an antenna 5. The antenna 5 radiates a radio wave corresponding to the transmitted signal inputted from the amplifier circuit 4, to the outside of the radar system 100.

The radio wave radiated from the antenna 5 is reflected or scattered (hereinafter, collectively referred to as "reflected") by an object present outside the radar system 100. Of reflected radio waves, a radio wave returning to the radar system 100 (hereinafter, referred to as a "reflected wave") is received by an antenna 6. The antenna 6 outputs a signal corresponding to the received reflected wave (hereinafter, referred to as a "received signal") to the mixer 7.

The mixer 7 mixes the transmitted signal inputted from the distribution circuit 3 with the received signal inputted from the antenna 6, and outputs a signal obtained by the mixing (hereinafter, referred to as a "mixed signal") to an amplifier circuit 8. The amplifier circuit 8 amplifies the mixed signal inputted from the mixer 7, and outputs the amplified mixed signal to a filter circuit 9. The filter circuit 9 suppresses unwanted frequency components of the mixed signal inputted from the amplifier circuit 8, and outputs the suppressed signal (hereinafter, referred to as an "observation signal") to an analog-digital converter 10.

The analog-digital converter (hereinafter, referred to as an "AD converter") 10 converts the observation signal inputted from the filter circuit 9 into digital voltage data. The AD converter 10 outputs the converted voltage data to a radar signal processing device 11.

The radar signal processing device 11 measures a relative moving speed of the above-described object having reflected radio waves (hereinafter, referred to as a "radio-wave-reflecting object") with respect to the radar system 100, using pieces of voltage data inputted from the AD converter 10. The relative moving speed of the radio-wave-reflecting object with respect to the radar system 100 may be hereinafter simply referred to as a "moving speed of the radio-wave-reflecting object" or "speed". In addition, the distance from the radar system 100 to the radio-wave-reflecting object may be simply referred to as a "distance". The details of the radar signal processing device 11 will be described later with reference to FIGS. 2 and 3.

Figure 3:
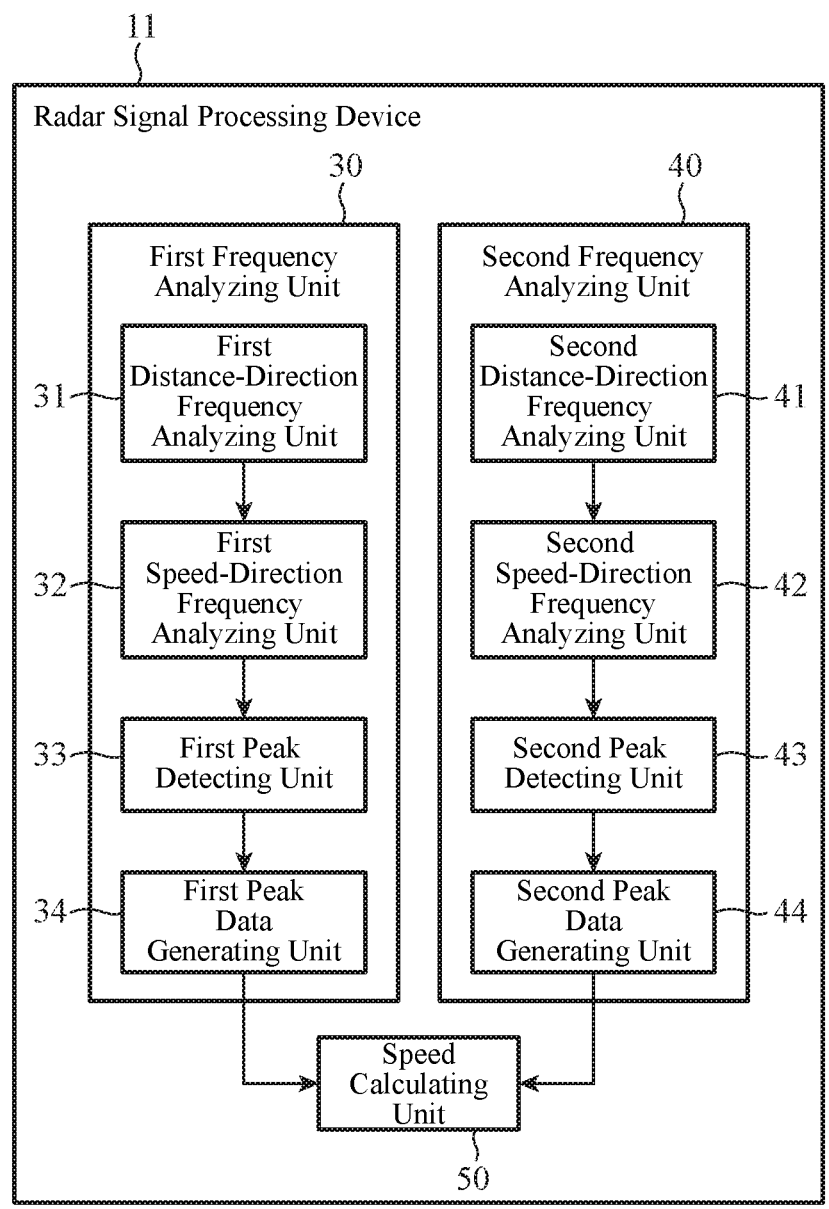
FIG. 3 is a functional block diagram showing the main part of the radar signal processing device according to the first embodiment of the present invention.

A control device 12 controls the operation timing of the voltage generating circuit 1, the AD converter 10, and the radar signal processing device 11, etc. Namely, the control device 12 controls the operation timing of each of a first frequency analyzing unit 30, a second frequency analyzing unit 40, and a speed calculating unit 50 which are shown in FIG. 3, etc.

The voltage generating circuit 1, the voltage controlled oscillator 2, the distribution circuit 3, the amplifier circuit 4, and the antenna 5 form a transmitter 13. The antenna 6, the mixer 7, the amplifier circuit 8, and the filter circuit 9 form a receiver 14. The AD converter 10, the radar signal processing device 11, the control device 12, the transmitter 13, and the receiver 14 form the radar system 100.

Figure 2A:
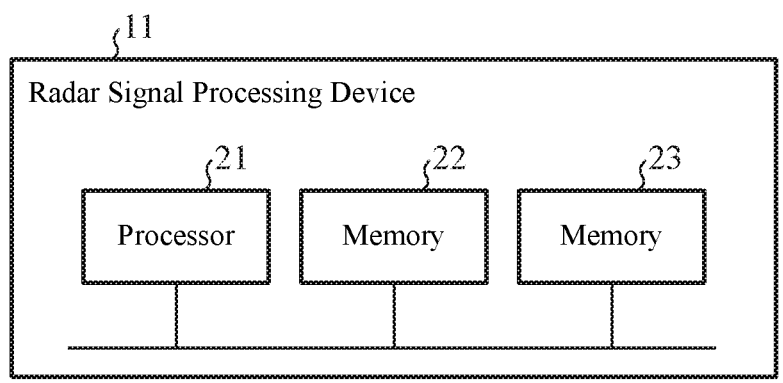
FIG. 2A is a hardware configuration diagram showing the main part of a radar signal processing device according to the first embodiment of the present invention.
Figure 2B:
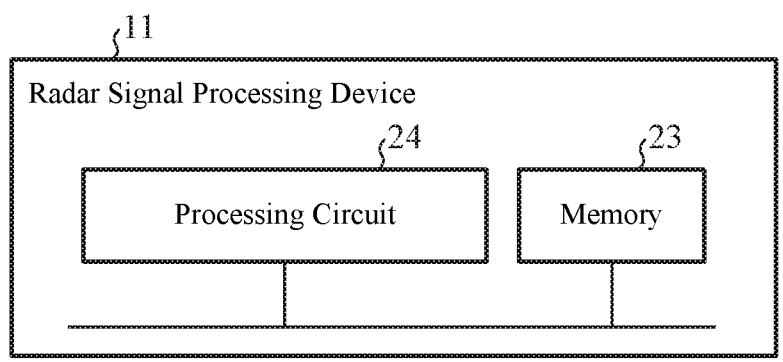
FIG. 2B is another hardware configuration diagram showing the main part of the radar signal processing device according to the first embodiment of the present invention.

FIG. 2A is a hardware configuration diagram showing the main part of the radar signal processing device according to the first embodiment of the present invention. FIG. 2B is another hardware configuration diagram showing the main part of the radar signal processing device according to the first embodiment of the present invention. FIG. 3 is a functional block diagram showing the main part of the radar signal processing device according to the first embodiment of the present invention. With reference to FIGS. 2 and 3, the radar signal processing device 11 will be described.

As shown in FIG. 2A, the radar signal processing device 11 is composed of a computer, and includes a processor 21 and memories 22 and 23. In the memory 22 is stored a program for causing the computer to function as the first frequency analyzing unit 30, the second frequency analyzing unit 40, and the speed calculating unit 50 which are shown in FIG. 3. By the processor 21 reading and executing the program stored in the memory 22, the functions of the first frequency analyzing unit 30, the second frequency analyzing unit 40, and the speed calculating unit 50 are implemented.

The memory 23 stores voltage data inputted from the AD converter 10. In addition, the memory 23 stores various types of data related to each process of the radar signal processing device 11.

The processor 21 is composed of, for example, a central processing unit (CPU), a digital signal processor (DSP), a microcontroller, a microprocessor, or the like. The memory 22 is composed of, for example, a semiconductor memory such as a random access memory (RAM), a read only memory (ROM), a flash memory, an erasable programmable read only memory (EPROM), or an electrically erasable programmable read-only memory (EEPROM). The memory 23 is composed of, for example, a semiconductor memory such as a RAM.

Note that, as shown in FIG. 2B, the functions of the first frequency analyzing unit 30, the second frequency analyzing unit 40, and the speed calculating unit 50 may be implemented by a dedicated processing circuit 24. The processing circuit 24 is, for example, an application specific integrated circuit (ASIC), a field-programmable gate array (FPGA), a programmable logic device (PLD), or a system large-scale integration (LSI), or a combination thereof.

In addition, each of the functions of the respective first frequency analyzing unit 30, second frequency analyzing unit 40, and speed calculating unit 50 may be implemented by the processing circuit 24, or the functions of the respective units may be collectively implemented by the processing circuit 24. In addition, the functions of some of the first frequency analyzing unit 30, the second frequency analyzing unit 40, and the speed calculating unit 50 may be implemented by the processor 21 and the memory 22, and other functions may be implemented by the processing circuit 24.

Each of the first frequency analyzing unit 30 and the second frequency analyzing unit 40 obtains voltage data from the memory 23, and performs frequency analysis, etc., on the obtained voltage data. The speed calculating unit 50 calculates a moving speed of a radio-wave-reflecting object, using results of the frequency analysis, etc., performed by the first frequency analyzing unit 30 and results of the frequency analysis, etc., performed by the second frequency analyzing unit 40.

Here, voltage data which is a target for frequency analysis, etc., performed by the first frequency analyzing unit 30 (hereinafter, referred to as "first voltage data") and voltage data which is a target for frequency analysis, etc., performed by the second frequency analyzing unit 40 (hereinafter, referred to as "second voltage data") each correspond to ranges of the same transmitted signal that have different modulation center frequencies.

Namely, in the first embodiment, the first frequency analyzing unit 30 obtains voltage data corresponding to substantially one period length of each period of transmitted signals among voltage data stored in the memory 23. The second frequency analyzing unit 40 obtains voltage data corresponding to substantially first-half period length of each period of the transmitted signals among the voltage data stored in the memory 23. By this, in the same transmitted signal, the modulation center frequency of a range corresponding to first voltage data and the modulation center frequency of a range corresponding to second voltage data have different values.

The first frequency analyzing unit 30 includes a first distance-direction frequency analyzing unit 31, a first speed-direction frequency analyzing unit 32, a first peak detecting unit 33, and a first peak data generating unit 34. The second frequency analyzing unit 40 includes a second distance-direction frequency analyzing unit 41, a second speed-direction frequency analyzing unit 42, a second peak detecting unit 43, and a second peak data generating unit 44. The details of processes performed by each of those units will be described later with reference to FIGS. 4 to 6.

In addition, the speed calculating unit 50 calculates a moving speed of the radio-wave-reflecting object by calculating a reference speed which is based on a difference value between the modulation center frequency of a range corresponding to first voltage data of a transmitted signal and the modulation center frequency of a range corresponding to second voltage data of the transmitted signal, and comparing a plurality of speed candidates with the reference speed. More specifically, the speed calculating unit 50 selects a speed candidate closest to the reference speed among the plurality of speed candidates, as the moving speed of the radio-wave-reflecting object. The details of a process performed by the speed calculating unit 50 will be described later with reference to FIG. 7.

The first frequency analyzing unit 30, the second frequency analyzing unit 40, and the speed calculating unit 50 form the radar signal processing device 11.

Figure 4:
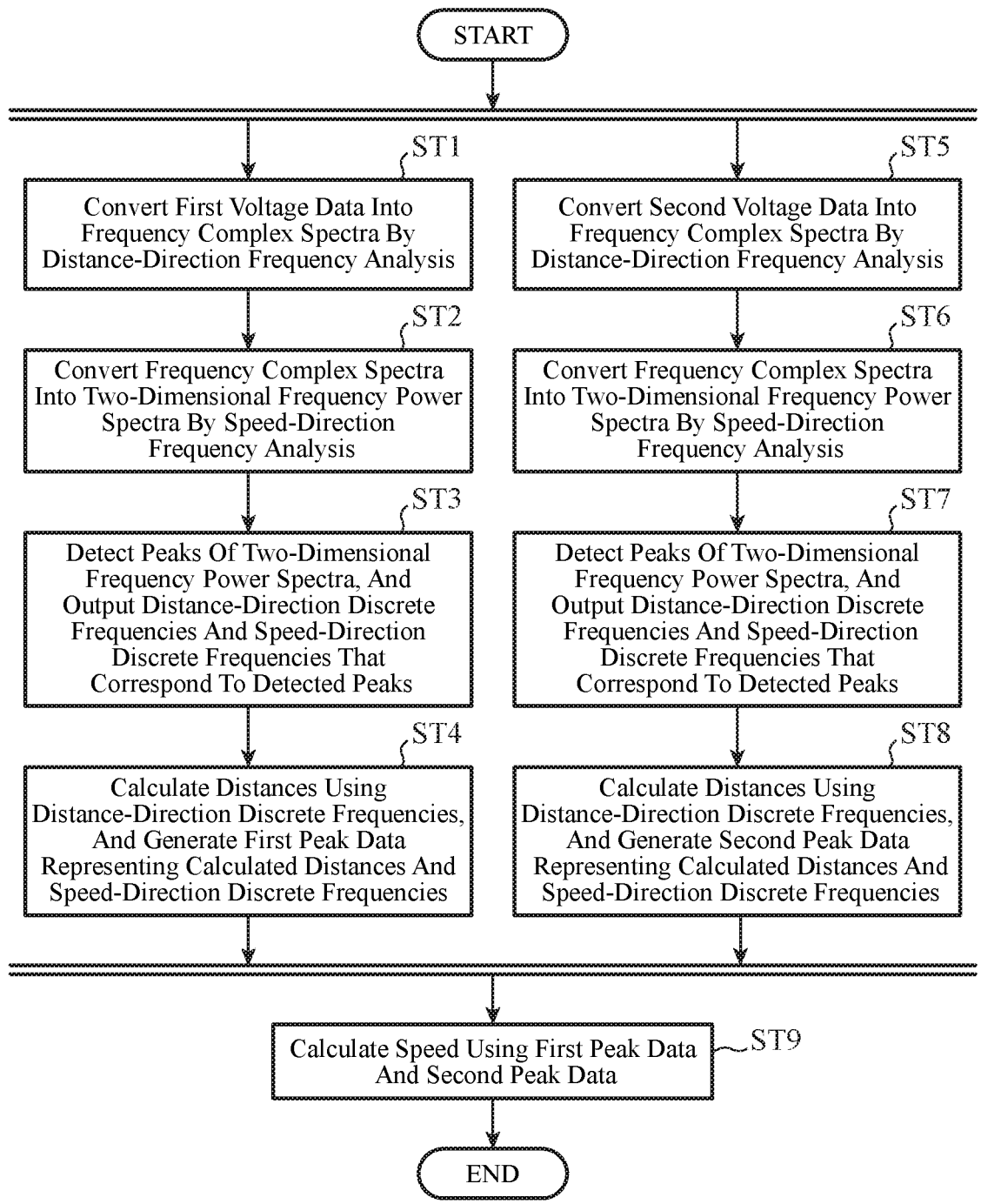
FIG. 4 is a flowchart showing the operation of the radar signal processing device according to the first embodiment of the present invention.

Next, with reference to FIGS. 4 to 6, the operation of the radar signal processing device 11 will be described.

Figures 5A, 5B, 5C:
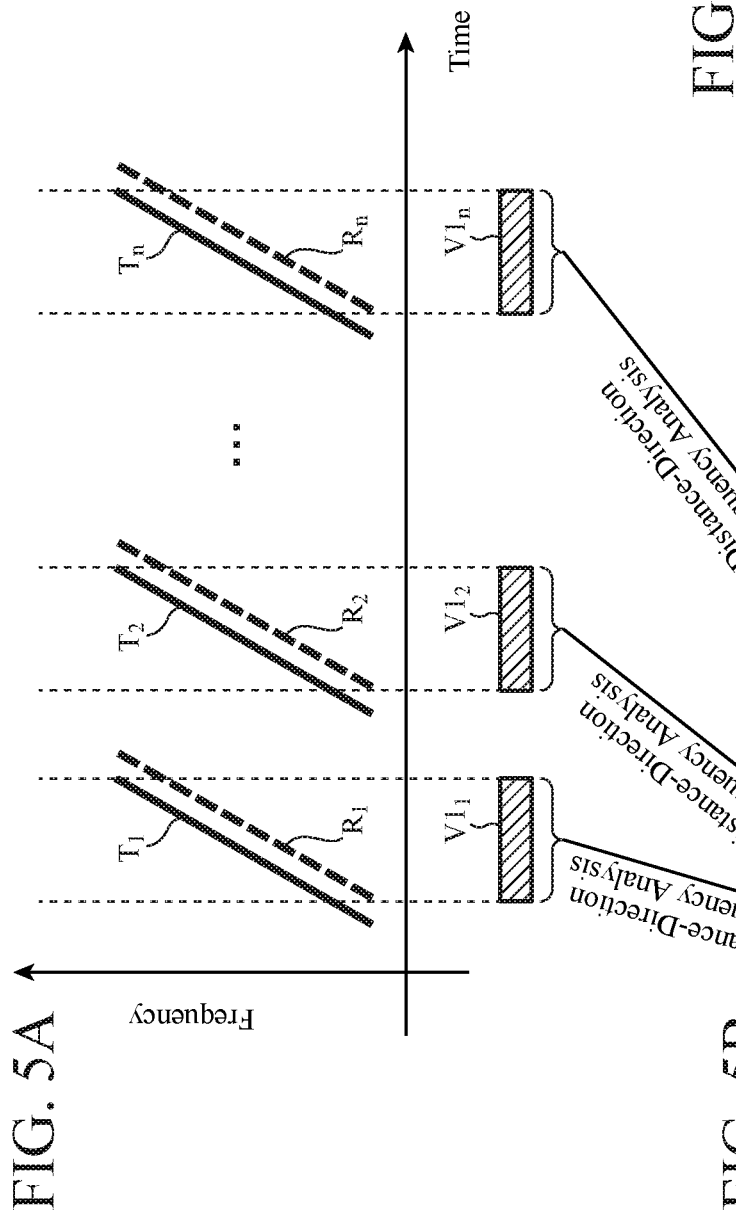
FIG. 5A is an illustrative diagram showing the waveforms of transmitted signals, the waveforms of received signals, and first voltage data according to the first embodiment of the present invention.
FIG. 5B is an illustrative diagram showing complex spectra into which the first voltage data shown in FIG. 5A are converted.
FIG. 5C is an illustrative diagram showing power spectra into which the complex spectra shown in FIG. 5B are converted.

In FIGS. 5A and 6A, $T_1$ to $T_n$ (n is an integer greater than or equal to 2) indicate the waveforms of transmitted signals for n periods, and $R_1$ to $R_n$ indicate the waveforms of received signals associated with the transmitted signals for each period. Namely, the transmitted signals $T_1$ to $T_n$ shown in FIG. 5A and the transmitted signals $T_1$ to $T_n$ shown in FIG. 6A are identical signals, and the received signals $R_1$ to $R_n$ shown in FIG. 5A and the received signals $R_1$ to $R_n$ shown in FIG. 6A are identical signals. As shown in FIGS. 5A and 6A, the frequencies of the transmitted signals $T_1$ to $T_n$ for each period linearly rise over time, and the frequencies of the received signals $R_1$ to $R_n$ change in the same manner as the frequencies of the transmitted signals $T_1$ to $T_n$.

At a point in time when it can be considered that all transmission has been completed and reception has been completed, in the memory 23 are stored in advance pieces of voltage data obtained by mixing the transmitted signals $T_1$ to $T_n$ with the received signals $R_1$ to $R_n$. The radar signal processing device 11 performs processes at step ST1 to ST9 shown in FIG. 4, under the control of the control device 12.

First, at step ST1, the first distance-direction frequency analyzing unit 31 obtains first voltage data $V1_1$ to $V1_n$ among the voltage data stored in the memory 23. As shown in FIG. 5A, the first voltage data $V1_1$ to $V1_n$ each are voltage data corresponding to substantially one period length of each period of the transmitted signals $T_1$ to $T_n$. The first distance-direction frequency analyzing unit 31 converts the first voltage data $V1_1$ to $V1_n$ into complex spectra $C1_1$ to $C1_n$ by performing frequency analysis such as a Fast Fourier Transform (hereinafter, referred to as an "FFT") on each of the first voltage data $V_1$ to $V1_n$. The first distance-direction frequency analyzing unit 31 stores the complex spectra $C_1$ to $C1_n$ in the memory 23.

Here, the discrete frequency of each of the complex spectra $C_1$ to $C1_n$ corresponds to the distance (see FIG. 5B), and each of the complex spectra $C1_1$ to $C1_n$ is a frequency complex spectrum in the distance direction. Namely, the first distance-direction frequency analyzing unit 31 converts voltage data into a frequency complex spectrum by frequency analysis in the distance direction (hereinafter, referred to as "distance-direction frequency analysis").

Then, at step ST2, the first speed-direction frequency analyzing unit 32 obtains the complex spectra $C1_1$ to $C1_n$ for all periods (for n periods in the example shown in FIG. 5) from the memory 23. The first speed-direction frequency analyzing unit 32 converts the complex spectra $C1_1$ to $C1_n$ into power spectra $P1_1$ to $P1_m$ (m is an integer greater than or equal to 2) by performing frequency analysis such as an FFT on parts of the complex spectra $C1_1$ to $C1_n$ whose discrete frequencies have the same distance. The first speed-direction frequency analyzing unit 32 stores the power spectra $P1_1$ to $P1_m$ as two-dimensional power spectra in the memory 23.

Here, the discrete frequency of each of the power spectra $P1_1$ to $P1_m$ corresponds to the speed (see FIG. 5C), and the two-dimensional power spectra from the power spectra $P1_1$ to $P1_m$ are two-dimensional frequency power spectra in the distance direction and the speed direction. Namely, the first speed-direction frequency analyzing unit 32 converts a frequency complex spectrum into a two-dimensional frequency power spectrum by frequency analysis in the speed direction (hereinafter, referred to as "speed-direction frequency analysis").

In addition, when the first speed-direction frequency analyzing unit 32 performs speed-direction frequency analysis, the first speed-direction frequency analyzing unit 32 adds zero-value data to the tail end of data to be converted (i.e., data representing parts of the complex spectra $C1_1$ to $C1_n$ whose discrete frequencies have the same distance), and performs frequency analysis such as an FFT on the data added with the zero-value data. By this, the frequency resolution of discrete frequencies corresponding to the speed can be made finer.

Then, at step ST3, the first peak detecting unit 33 obtains the two-dimensional frequency power spectra from the power spectra $P1_1$ to $P1_m$ from the memory 23, and detects peaks of the obtained two-dimensional frequency power spectra. More specifically, the first peak detecting unit 33 compares the power of a two-dimensional power spectrum with a threshold value. The threshold value may be calculated one by one from two-dimensional power spectra, or may be set in advance. The first peak detecting unit 33 detects, as a peak, a part of a two-dimensional power spectrum whose power is greater than the threshold value and is maximal.

The first peak detecting unit 33 outputs discrete frequencies in the distance direction (hereinafter, referred to as "distance-direction discrete frequencies") corresponding to the detected peaks and discrete frequencies in the speed direction (hereinafter, referred to as "speed-direction discrete frequencies") corresponding to the detected peaks to the first peak data generating unit 34. Here, the number of the detected peaks is N_1.

Then, at step ST4, the first peak data generating unit 34 calculates distances Dst_1[k_1]{k_1=1 to N_1} by the following equation (1) on the basis of the frequency modulated continuous wave (FMCW) radar principle, using the distance-direction discrete frequencies F_1[k_1]{k_1=1 to N_1} inputted from the first peak detecting unit 33.

$$Dst\_1[k\_1]=(C \times T\_1 \times F\_1[k\_1])/(2 \times B\_1)\{k\_1=1 \text{ to } N\_1\} \quad (1)$$

Here, C represents the speed of a radio wave. T_1 represents the modulation duration of a range of a transmitted signal corresponding to first voltage data, i.e., a modulation duration corresponding to substantially one period length of each period. B_1 represents the modulation frequency width of the range of the transmitted signal corresponding to the first voltage data, i.e., a modulation frequency width corresponding to substantially one period length of each period.

The first peak data generating unit 34 generates data (hereinafter, referred to as "first peak data") representing the calculated distances Dst_1[$k\_1$]{$k\_1=1$ to $N\_1$} and the speed-direction discrete frequencies Fv_1[$k\_1$]{$k\_1=1$ to $N\_1$} inputted from the first peak detecting unit 33. The first peak data generating unit 34 stores the first peak data in the memory 23.

In addition, at step ST5, the second distance-direction frequency analyzing unit 41 obtains second voltage data $V2_1$ to $V2_n$ among the voltage data stored in the memory 23. As shown in FIG. 6A, the second voltage data $V2_1$ to $V2_n$ each are voltage data corresponding to substantially first-half period length of each period of the transmitted signals $T_1$ to $T_n$. The second distance-direction frequency analyzing unit 41 converts the second voltage data $V2_1$ to $V2_n$ into complex spectra $C2_1$ to $C2_n$ by performing frequency analysis such as an FFT on each of the second voltage data $V2_1$ to $V2_n$. The second distance-direction frequency analyzing unit 41 stores the complex spectra $C2_1$ to $C2_n$ in the memory 23.

Here, the discrete frequency of each of the complex spectra $C2_1$ to $C2_n$ corresponds to the distance (see FIG. 6B), and each of the complex spectra $C2_1$ to $C2_n$ is a frequency complex spectrum in the distance direction. Namely, the second distance-direction frequency analyzing unit 41 converts voltage data into a frequency complex spectrum by distance-direction frequency analysis.

Then, at step ST6, the second speed-direction frequency analyzing unit 42 obtains the complex spectra $C2_1$ to $C2_n$ for all periods (for n periods in the example shown in FIG. 6) from the memory 23. The second speed-direction frequency analyzing unit 42 converts the complex spectra $C2_1$ to $C2_n$ into power spectra $P2_1$ to $P2_m$ by performing frequency analysis such as an FFT on parts of the complex spectra $C2_1$ to $C2_n$ whose discrete frequencies have the same distance. The second speed-direction frequency analyzing unit 42 stores the power spectra $P2_1$ to $P2_m$ as two-dimensional power spectra in the memory 23.

Here, the discrete frequency of each of the power spectra $P2_1$ to $P2_m$ corresponds to the speed (see FIG. 6C), and the two-dimensional power spectra from the power spectra $P2_1$ to $P2_m$ are two-dimensional frequency power spectra in the distance direction and the speed direction. Namely, the second speed-direction frequency analyzing unit 42 converts a frequency complex spectrum into a two-dimensional frequency power spectrum by speed-direction frequency analysis.

In addition, when the second speed-direction frequency analyzing unit 42 performs speed-direction frequency analysis, the second speed-direction frequency analyzing unit 42 adds zero-value data to the tail end of data to be converted (i.e., data representing parts of the complex spectra $C2_1$ to $C2_n$ whose discrete frequencies have the same distance), and performs frequency analysis such as an FFT on the data added with the zero-value data. By this, the frequency resolution of discrete frequencies corresponding to the speed can be made finer.

Then, at step ST7, the second peak detecting unit 43 obtains the two-dimensional frequency power spectra from the power spectra $P2_1$ to $P2_m$ from the memory 23, and detects peaks of the obtained two-dimensional frequency power spectra. More specifically, the second peak detecting unit 43 detects peaks by the same method as that used by the first peak detecting unit 33. The second peak detecting unit 43 outputs distance-direction discrete frequencies corresponding to the detected peaks and speed-direction discrete frequencies corresponding to the detected peaks to the second peak data generating unit 44. Here, the number of the detected peaks is $N\_2$.

Then, at step ST8, the second peak data generating unit 44 calculates distances Dst_2[$k\_2$]{$k\_2=1$ to $N\_2$} by the following equation (2) on the basis of the FMCW radar principle, using the distance-direction discrete frequencies F_2[$k\_2$]{$k\_2=1$ to $N\_2$} inputted from the second peak detecting unit 43.

$$\text{Dst}\_2[k\_2]=(C\times T\_2\times F\_2[k\_2])/(2\times B\_2)\{k\_2=1 \text{ to } N\_2\} \tag{2}$$

Here, C represents the speed of a radio wave. $T\_2$ represents the modulation duration of a range of a transmitted signal corresponding to second voltage data, i.e., a modulation duration corresponding to substantially first-half period length of each period. $B\_2$ represents the modulation frequency width of the range of the transmitted signal corresponding to the second voltage data, i.e., a modulation frequency width corresponding to substantially first-half period length of each period.

The second peak data generating unit 44 generates data (hereinafter, referred to as "second peak data") representing the calculated distances Dst_2[$k\_2$]{$k\_2=1$ to $N\_2$} and the speed-direction discrete frequencies Fv_2[$k\_2$]{$k\_2=1$ to $N\_2$} inputted from the second peak detecting unit 43. The second peak data generating unit 44 stores the second peak data in the memory 23.

Then, at step ST9, the speed calculating unit 50 obtains the first peak data generated at step ST4 and the second peak data generated at step ST8 from the memory 23. The speed calculating unit 50 calculates a moving speed of the radio-wave-reflecting object, using the obtained first peak data and second peak data.

Figure 7:
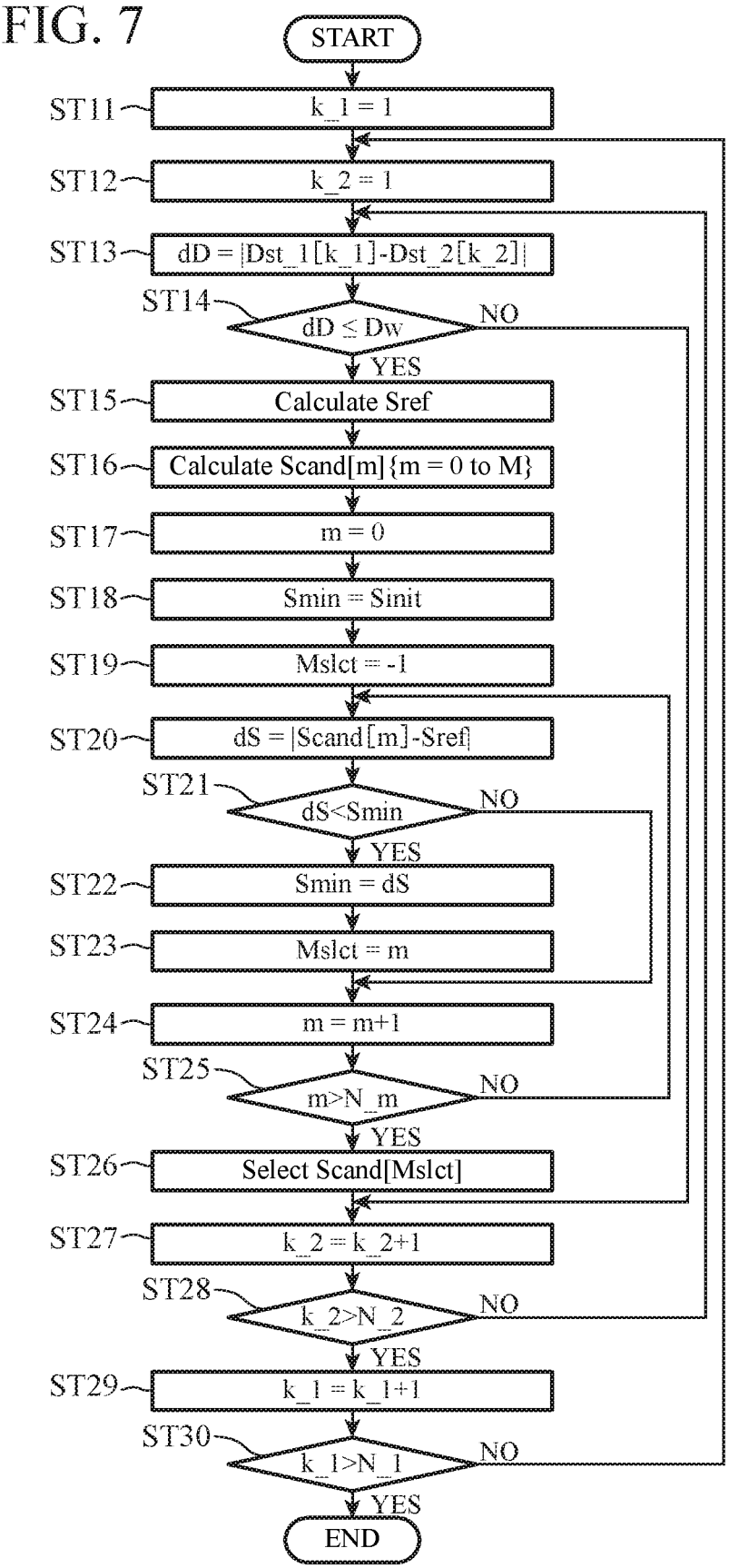
FIG. 7 is a flowchart showing the operation of a speed calculating unit according to the first embodiment of the present invention.

Next, with reference to a flowchart of FIG. 7, the details of the process at step ST9 performed by the speed calculating unit 50 will be described.

At step ST11, the speed calculating unit 50 initializes the value of a counter $k\_1$ corresponding to the peak of the first peak data to 1. Then, the speed calculating unit 50 proceeds to step ST12.

At step ST12, the speed calculating unit 50 initializes the value of a counter $k\_2$ corresponding to the peak of the second peak data to 1. Then, the speed calculating unit 50 proceeds to step ST13.

At step ST13, the speed calculating unit 50 calculates an absolute value dD of a difference value between a distance Dst_1[$k\_1$] for the $k\_1$th peak of the first peak data and a distance Dst_2[$k\_2$] for the $k\_2$th peak of the second peak data, by the following equation (3). After calculating the absolute value dD, the speed calculating unit 50 proceeds to step ST14.

$$dD=|\text{Dst}\_1[k\_1]-\text{Dst}\_2[k\_2]| \tag{3}$$

At step ST14, the speed calculating unit 50 calculates a distance difference Dw by the following equation (4). The distance difference Dw occurs due to the difference between a modulation frequency width $B\_1$ of a range of a transmitted signal corresponding to first voltage data and a modulation frequency width $B\_2$ of a range of the transmitted signal corresponding to second voltage data.

$$Dw=C/(2\times B\_2) \tag{4}$$

The speed calculating unit 50 compares the absolute value dD with the distance difference Dw. When the absolute value dD is a value less than or equal to the distance difference Dw ("YES" at step ST14), the speed calculating unit 50 proceeds to step ST15. On the other hand, when the absolute value dD is a value greater than the distance difference Dw ("NO" at step ST14), the speed calculating unit 50 proceeds to step ST27.

At step ST15, the speed calculating unit 50 calculates a reference speed Sref by a method in which spectrum folding does not occur at frequencies in the speed direction. Namely, the speed calculating unit 50 calculates a reference speed Sref as shown below.

For a speed-direction discrete frequency Fv_1[k_1] represented by the first peak data, when the moving speed of the radio-wave-reflecting object is Spd_1[k_1] and the modulation center frequency of the range of the transmitted signal corresponding to the first voltage data is Fc_1, the following equation (5) holds by the Doppler effect principle.

$$Fv\_1[k\_1]=2\times Fc\_1\times Spd\_1[k\_1]/C \qquad (5)$$

For a speed-direction discrete frequency Fv_2[k_2] represented by the second peak data, when the moving speed of the radio-wave-reflecting object is Spd_2[k_2] and the modulation center frequency of the range of the transmitted signal corresponding to the second voltage data is Fc_2, the following equation (6) holds by the Doppler effect principle.

$$Fv\_2[k\_2]=2\times Fc\_2\times Spd\_2[k\_2]/C \qquad (6)$$

When a radio-wave-reflecting object related to equation (5) and a radio-wave-reflecting object related to equation (6) are identical objects, Spd_1[k_1]=Spd_2[k_2]. Here, when Spd_1[k_1]=Spd_2[k_2]=Spd, by modifying equation (5), the following equation (7) is obtained. In addition, by modifying equation (6), the following equation (8) is obtained.

$$Fv\_1[k\_1]=2\times Fc\_1\times Spd/C \qquad (7)$$

$$Fv\_2[k\_2]=2\times Fc\_2\times Spd/C \qquad (8)$$

At this time, a difference between the left side of equation (7) and the left side of equation (8) and a difference between the right side of equation (7) and the right side of equation (8) are represented by the following equation (9).

$$Fv\_1[k\_1]-Fv\_2[k\_2]=2\times (Fc\_1-Fc\_2)\times Spd/C \qquad (9)$$

Equation (9) represents a state in which when a radio wave is transmitted at a lower frequency (Fc_1−Fc_2) than Fc_1 or Fc_2, the Doppler shift frequency is (Fv_1[k_1]−Fv_2[k_2]). Here, (Fv_1[k_1]−Fv_2[k_2]) is a frequency difference and thus has a value which is small and at which spectrum folding does not occur. Hence, the speed calculating unit 50 calculates a reference speed Sref by the following equation (10) obtained by modifying equation (9).

$$Sref=C\times (Fv\_1[k\_1]-Fv\_2[k\_2])/(2\times (Fc\_1-Fc\_2)) \qquad (10)$$

Note that when a reference speed Sref is calculated by equation (10), although spectrum folding does not occur at frequencies in the speed direction, since it is equivalent to a state in which the frequency of the transmitted signal is low, the accuracy of speed measurement is low. Hence, as described above, each of the first speed-direction frequency analyzing unit 32 and the second speed-direction frequency analyzing unit 42 adds zero-value data to data to be converted, and then performs frequency analysis such as an FFT. By this, the frequency resolution of discrete frequencies corresponding to the speed can be made finer, and thus, the accuracy of speed measurement can be improved.

After calculating the reference speed Sref, the speed calculating unit 50 proceeds to step ST16.

At step ST16, the speed calculating unit 50 calculates a plurality of speed candidates Scand[m]{m=0 to M} by the Doppler effect principle, using the speed-direction discrete frequencies Fv_1[k_1]{k_1=1 to N_1} represented by the first peak data, as spectrum folding due to a repetition period of a chirp signal can occur M times at the maximum.

At this time, the speed calculating unit 50 switches a method of calculating speed candidates, depending on the value of the reference speed Sref calculated at step ST15. When the reference speed Sref has a value greater than or equal to 0 (Sref≥0), the speed calculating unit 50 calculates speed candidates Scand[m] by the following equation (11). On the other hand, when the reference speed Sref has a value less than 0 (Sref<0), the speed calculating unit 50 calculates speed candidates Scand[m] by the following equation (12). Here, Trpt represents the repetition period of the chirp signal.

$$Scand[m]=C\times (Fv\_1[k\_1]+m/Trpt)/(2\times Fc\_1)\{m=0 \text{ to } M\} \qquad (11)$$

$$Scand[m]=C\times (Fv\_1[k\_1]-m/Trpt)/(2\times Fc\_1)\{m=0 \text{ to } M\} \qquad (12)$$

After calculating the speed candidates Scand[m], the speed calculating unit 50 proceeds to step ST17.

At step ST17, the speed calculating unit 50 initializes the value of a counter m corresponding to the speed candidate Scand[m] to 0. Then, the speed calculating unit 50 proceeds to step ST18.

At step ST18, the speed calculating unit 50 sets the initial value of a minimum speed difference Smin to the same value as speed Sinit whose absolute value is largest in a range to be measured. Then, the speed calculating unit 50 proceeds to step ST19.

At step ST19, the speed calculating unit 50 initializes a selection number Mslct to −1. Then, the speed calculating unit 50 proceeds to step ST20.

At step ST20, the speed calculating unit 50 calculates an absolute value dS of a difference value between the mth speed candidate Scand[m] and the reference speed Sref Then, the speed calculating unit 50 proceeds to step ST21.

At step ST21, the speed calculating unit 50 compares the absolute value dS with the minimum speed difference Smin. When the absolute value dS is a value smaller than the minimum speed difference Smin ("YES" at step ST21), the speed calculating unit 50 proceeds to step ST22. On the other hand, when the absolute value dS is a value greater than or equal to the minimum speed difference Smin ("NO" at step ST21), the speed calculating unit 50 proceeds to step ST24.

At step ST22, the speed calculating unit 50 updates the minimum speed difference Smin to the same value as the absolute value dS. Then, the speed calculating unit 50 proceeds to step ST23.

At step ST23, the speed calculating unit 50 updates the selection number Mslct to the same value as the counter m. Then, the speed calculating unit 50 proceeds to step ST24.

At step ST24, the speed calculating unit 50 increments the value of the counter m. Then, the speed calculating unit 50 proceeds to step ST25.

At step ST25, the speed calculating unit 50 compares the value of the counter m with N_m. When the counter m indicates a value larger than N_m ("YES" at step ST25), the speed calculating unit 50 proceeds to step ST26. On the other hand, when the counter m indicates a value less than or equal to N_m ("NO" at step ST25), the speed calculating unit 50 returns to step ST20.

At step ST26, the speed calculating unit 50 selects the speed candidate Scand[Mslct] as speed for the k_1th peak of the first peak data, i.e., a moving speed of the radio-wave-reflecting object. Then, the speed calculating unit 50 proceeds to step ST27.

At step ST27, the speed calculating unit 50 increments the value of the counter k_2. Then, the speed calculating unit 50 proceeds to step ST28.

At step ST28, the speed calculating unit 50 compares the value of the counter k_2 with N_2. When the counter k_2 indicates a value larger than N_2 ("YES" at step ST28), the speed calculating unit 50 proceeds to step ST29. On the other hand, when the counter k_2 indicates a value less than or equal to N_2 ("NO" at step ST28), the speed calculating unit 50 returns to step ST13.

At step ST29, the speed calculating unit 50 increments the value of the counter k_1. Then, the speed calculating unit 50 proceeds to step ST30.

At step ST30, the speed calculating unit 50 compares the value of the counter k_1 with N_1. When the counter k_1 indicates a value larger than N_1 ("YES" at step ST30), the speed calculating unit 50 ends the process. On the other hand, when the counter k_1 indicates a value less than or equal to N_1 ("NO" at step ST30), the speed calculating unit 50 returns to step ST12.

As such, the speed calculating unit 50 calculates a reference speed Sref which is based on a difference value (Fc_1–Fc_2) between the modulation center frequency Fc_1 of a range of a transmitted signal corresponding to first voltage data and the modulation center frequency Fc_2 of a range of the transmitted signal corresponding to second voltage data (step ST15), compares a plurality of speed candidates Scand[m] with the reference speed Sref (step ST16 to ST25), and selects a speed candidate Scand[Mslct] closest to the reference speed Sref among the plurality of speed candidates Scand[m], as a moving speed of a radio-wave-reflecting object (step ST26). As shown in equation (10), since the reference speed Sref can be calculated by a method in which spectrum folding does not occur at frequencies in the speed direction, ambiguity in speed measurement can be eliminated.

In addition, frequency analysis, etc., performed by the first frequency analyzing unit 30 and frequency analysis, etc., performed by the second frequency analyzing unit 40 are processes for the same transmitted signal, and can be performed in parallel. Hence, compared with the radar system of Patent Literature 1, an increase in the time required to measure speed can be avoided.

In addition, frequency analysis, etc., performed by the first frequency analyzing unit 30 and frequency analysis, etc., performed by the second frequency analyzing unit 40 are processes for the same transmitted signal, and switching of a frequency range of a radio wave corresponding to a transmitted signal is not required. Hence, compared with the radar system of Patent Literature 2, the need for an additional circuit such as a frequency compensation circuit can be eliminated.

Note that the radar signal processing device 11 may measure a distance from the radar system 100 to a radio-wave-reflecting object, in addition to a moving speed of the radio-wave-reflecting object. Namely, the radar signal processing device 11 may include a distance calculating unit (not shown) that calculates a distance from the radar system 100 to a radio-wave-reflecting object, using distances Dst_1[k_1]{k_1=1 to N_1} represented by first peak data and distances Dst_2[k_2]{k_2=1 to N_2} represented by second peak data.

In addition, the control device 12 may be integrally formed with the radar signal processing device 11. Namely, a program for implementing the function of the control device 12 may be stored in the memory 22, and the function of the control device 12 may be implemented by the processor 21 reading and executing the program stored in the memory 22. Alternatively, the function of the control device 12 may be implemented by the dedicated processing circuit 24.

In addition, the memory 23 may be provided external to the radar signal processing device 11. Namely, the radar signal processing device 11 may be composed of the processor 21 and the memory 22. Alternatively, the radar signal processing device 11 may be composed of the processing circuit 24.

In addition, first voltage data and second voltage data may be any as long as they each correspond to ranges of the same transmitted signal that have different modulation center frequencies. Namely, the first voltage data is not limited to voltage data corresponding to substantially one period length of each period of transmitted signals. The second voltage data is not limited to voltage data corresponding to substantially first-half period length of each period of the transmitted signals.

In addition, the meaning of the term "one period length" recited in the claims of the present application is not limited to complete one period length, and also includes substantially one period length such as that shown in FIG. 5A. The meaning of the term "first-half period length" recited in the claims of the present application is not limited to complete first-half period length, and also includes substantially first-half period length such as that shown in FIG. 6A.

As described above, the radar signal processing device 11 of the first embodiment is the radar signal processing device 11 that measures a moving speed of an object using voltage data obtained by mixing transmitted signals $T_1$ to $T_n$ which are chirp signals with received signals $R_1$ to $R_n$ corresponding to reflected waves of radio waves corresponding to the transmitted signals $T_1$ to $T_n$, the object having reflected the radio waves, and includes the first frequency analyzing unit 30 that performs frequency analysis on first voltage data $V1_1$ to $V1_n$ among the voltage data; the second frequency analyzing unit 40 that performs frequency analysis on second voltage data $V2_1$ to $V2_n$ among the voltage data; and the speed calculating unit 50 that calculates the moving speed of the object using results of the frequency analysis performed by the first frequency analyzing unit 30 and results of the frequency analysis performed by the second frequency analyzing unit 40, and the first voltage data $V1_1$ to $V1_n$ and the second voltage data $V2_1$ to $V2_n$ each correspond to ranges of each of the transmitted signals $T_1$ to $T_n$ that have different modulation center frequencies, and the speed calculating unit 50 calculates the moving speed of the object by calculating a reference speed Sref which is based on a difference value between the modulation center frequency Fc_1 of the range corresponding to the first voltage data $V1_1$ to $V1_n$ and the modulation center frequency Fc_2 of the range corresponding to the second voltage data $V2_1$ to $V2_n$, and comparing a plurality of speed candidates Scand[m] with the reference speed Sref As shown in equation (10), since the reference speed Sref can be calculated by a method in which spectrum folding does not occur at frequencies in the speed direction, ambiguity in speed measurement can be eliminated. In addition, an increase in the time required to measure speed can be avoided, and the need for an additional circuit such as a frequency compensation circuit can be eliminated.

In addition, the frequency analysis performed by each of the first frequency analyzing unit 30 and the second frequency analyzing unit 40 includes distance-direction frequency analysis that converts the voltage data into frequency complex spectra and speed-direction frequency analysis that converts the frequency complex spectra into two-dimensional frequency power spectra, and the speed-direction frequency analysis adds zero-value data to the tail end of data to be converted, and performs frequency analysis on the data added with the zero-value data. By this, the frequency resolution of discrete frequencies corresponding to the speed can be made finer. As a result, the accuracy of speed measurement by the radar signal processing device 11 can be improved.

In addition, the first voltage data $V1_1$ to $V1_n$ each are voltage data corresponding to one period length of each period of the transmitted signals $T_1$ to $T_n$, and the second voltage data $V2_1$ to $V2_n$ each are voltage data corresponding to first-half period length of each period of the transmitted signals $T_1$ to $T_n$. By this, in the same transmitted signals $T_1$ to $T_n$, the modulation center frequency Fc_1 and the modulation center frequency Fc_2 can have different values.

Second Embodiment

Figure 8:
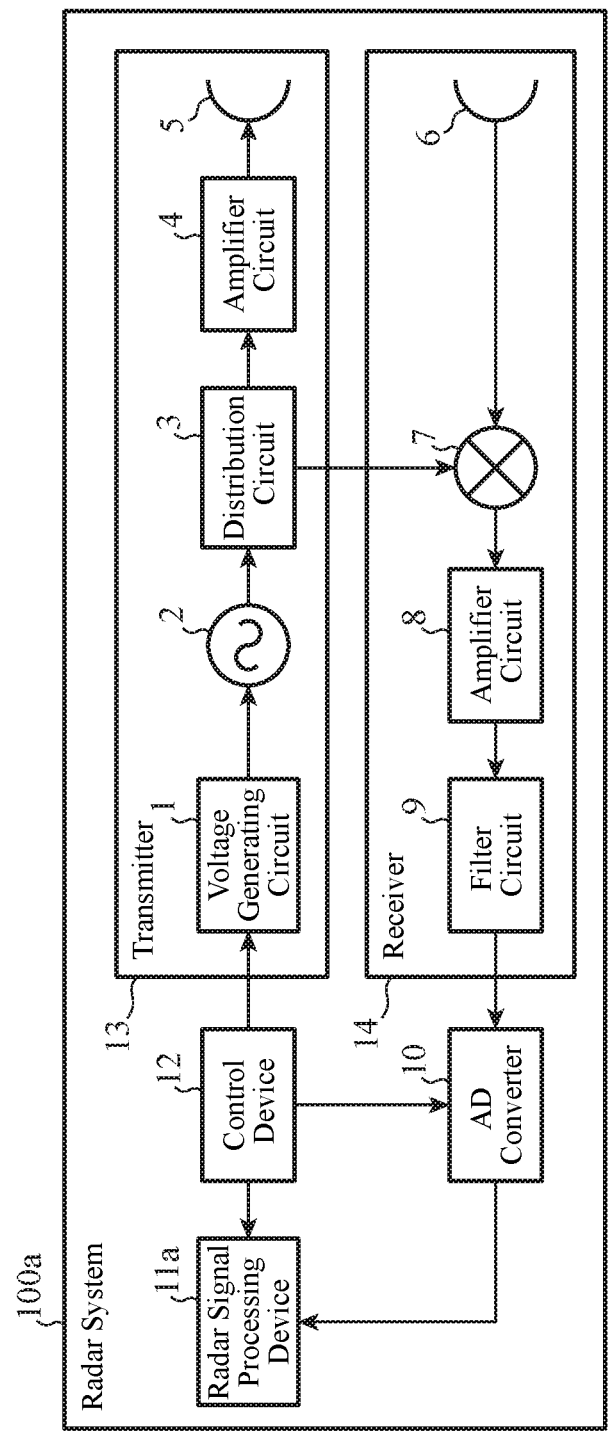
FIG. 8 is a system configuration diagram showing the main part of a radar system according to a second embodiment of the present invention.
Figure 9A:
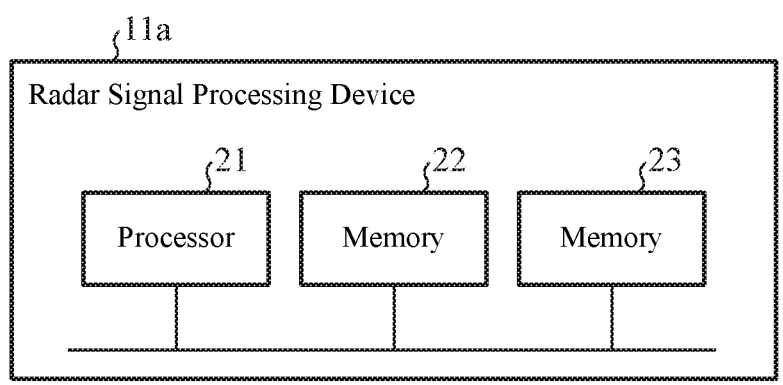
FIG. 9A is a hardware configuration diagram showing the main part of a radar signal processing device according to the second embodiment of the present invention.
Figure 9B:
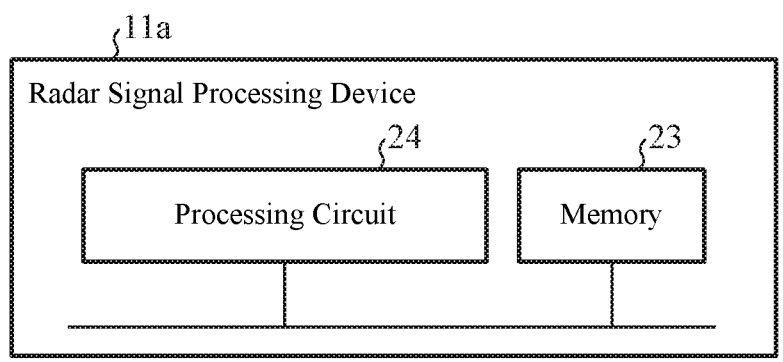
FIG. 9B is another hardware configuration diagram showing the main part of the radar signal processing device according to the second embodiment of the present invention.
Figure 10:
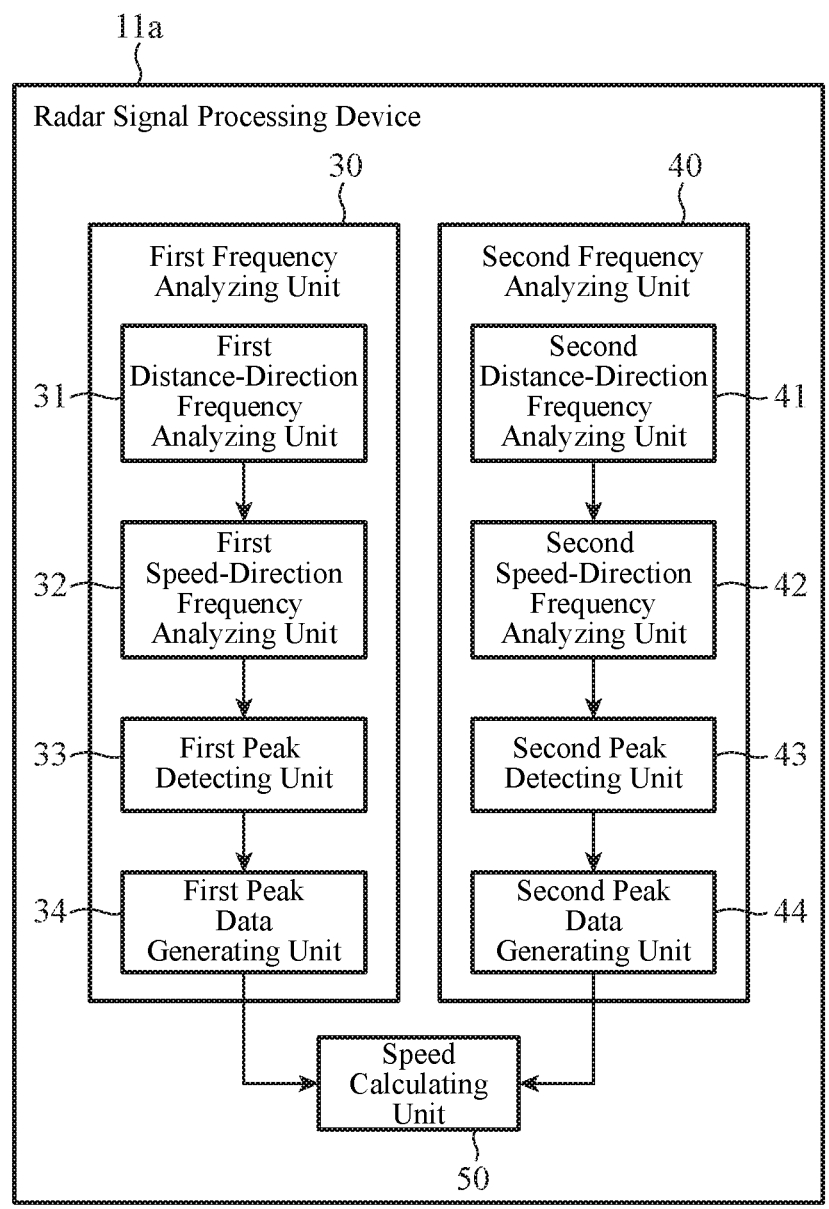
FIG. 10 is a functional block diagram showing the main part of the radar signal processing device according to the second embodiment of the present invention.

FIG. 8 is a system configuration diagram showing the main part of a radar system according to a second embodiment of the present invention. FIG. 9A is a hardware configuration diagram showing the main part of a radar signal processing device according to the second embodiment of the present invention. FIG. 9B is another hardware configuration diagram showing the main part of the radar signal processing device according to the second embodiment of the present invention. FIG. 10 is a functional block diagram showing the main part of the radar signal processing device according to the second embodiment of the present invention. With reference to FIGS. 8 to 10, a radar system 100a and a radar signal processing device 11a of the second embodiment will be described.

Note that in FIG. 8 the same blocks, etc., as those of the system configuration diagram of the first embodiment shown in FIG. 1 are denoted by the same reference signs and description thereof is omitted. In FIG. 9, the same blocks as those of the hardware configuration diagram of the first embodiment shown in FIG. 2 are denoted by the same reference signs and description thereof is omitted. In FIG. 10, the same blocks as those of the functional block diagram of the first embodiment shown in FIG. 3 are denoted by the same reference signs and description thereof is omitted.

In the second embodiment, the first distance-direction frequency analyzing unit 31 obtains voltage data corresponding to substantially first-half period length of each period of transmitted signals among voltage data stored in the memory 23. The second distance-direction frequency analyzing unit 41 obtains voltage data corresponding to substantially second-half period length of each period of the transmitted signals among the voltage data stored in the memory 23. By this, in the same transmitted signal, the modulation center frequency of a range corresponding to first voltage data and the modulation center frequency of a range corresponding to second voltage data have different values.

The first distance-direction frequency analyzing unit 31, the first speed-direction frequency analyzing unit 32, the first peak detecting unit 33, and the first peak data generating unit 34 form the first frequency analyzing unit 30. The second distance-direction frequency analyzing unit 41, the second speed-direction frequency analyzing unit 42, the second peak detecting unit 43, and the second peak data generating unit 44 form the second frequency analyzing unit 40. The first frequency analyzing unit 30, the second frequency analyzing unit 40, and the speed calculating unit 50 form the radar signal processing device 11a. The AD converter 10, the radar signal processing device 11a, the control device 12, the transmitter 13, and the receiver 14 form the radar system 100a.

Next, with reference to FIGS. 11 and 12, the operation of the radar signal processing device 11a will be described. Note that a flowchart is the same as that of FIG. 4 and thus a depiction thereof is omitted.

First, the first distance-direction frequency analyzing unit 31 obtains first voltage data $V1_1'$ to $V1_n'$ among voltage data stored in the memory 23. As shown in FIG. 11A, the first voltage data $V1_1'$ to $V1_n'$ each are voltage data corresponding to substantially first-half period length of each period of transmitted signals $T_1$ to $T_n$. The first distance-direction frequency analyzing unit 31 converts the first voltage data $V1_1'$ to $V1_n'$ into complex spectra $C1_1'$ to $C1_n'$ by distance-direction frequency analysis.

Then, the first speed-direction frequency analyzing unit 32 converts the complex spectra $C1_1'$ to $C1_n'$ into power spectra $P1_1'$ to $P1_m'$ by speed-direction frequency analysis. The first speed-direction frequency analyzing unit 32 stores the power spectra $P1_1'$ to $P1_m'$ as two-dimensional power spectra in the memory 23.

Then, the first peak detecting unit 33 obtains the two-dimensional frequency power spectra from the power spectra P1 to P1$_m'$ from the memory 23, and detects peaks of the obtained two-dimensional frequency power spectra. The first peak detecting unit 33 outputs distance-direction discrete frequencies corresponding to the detected peaks and speed-direction discrete frequencies corresponding to the detected peaks to the first peak data generating unit 34. Here, the number of the detected peaks is N_1.

Then, the first peak data generating unit 34 calculates distances Dst_1[k_1]{k_1=1 to N_1} by the same equation (1) as that of the first embodiment, using the distance-direction discrete frequencies F_1[k_1]{k_1=1 to N_1} inputted from the first peak detecting unit 33. Note, however, that in the second embodiment T_1 represents a modulation duration corresponding to substantially first-half period length of each period of the transmitted signals, and B_1 represents a modulation frequency width corresponding to substantially first-half period length of each period of the transmitted signals.

The first peak data generating unit 34 generates first peak data representing the calculated distances Dst_1[k_1]{k_1=1 to N_1} and the speed-direction discrete frequencies Fv_1[k_1]{k_1=1 to N_1} inputted from the first peak detecting unit 33. The first peak data generating unit 34 stores the first peak data in the memory 23.

In addition, the second distance-direction frequency analyzing unit 41 obtains second voltage data $V2_1'$ to $V2_n'$ among the voltage data stored in the memory 23. As shown in FIG. 12A, the second voltage data $V2_1'$ to $V2_n'$ each are voltage data corresponding to substantially second-half period length of each period of the transmitted signals $T_1$ to $T_n$. The second distance-direction frequency analyzing unit 41 converts the second voltage data $V2_1'$ to $V2_n'$ into complex spectra $C2_1'$ to $C2_n'$ by distance-direction frequency analysis.

Then, the second speed-direction frequency analyzing unit 42 converts the complex spectra $C2_1'$ to $C2_n'$ into power spectra $P2_1'$ to $P2_m'$ by speed-direction frequency analysis. The second speed-direction frequency analyzing unit 42 stores the power spectra $P2_1'$ to $P2_m'$ as two-dimensional power spectra in the memory 23.

Then, the second peak detecting unit 43 obtains the two-dimensional frequency power spectra from the power spectra $P2_1'$ to $P2_m'$ from the memory 23, and detects peaks of the obtained two-dimensional frequency power spectra. The second peak detecting unit 43 outputs distance-direction discrete frequencies corresponding to the detected peaks and speed-direction discrete frequencies corresponding to the detected peaks to the second peak data generating unit 44. Here, the number of the detected peaks is N_2.

Then, the second peak data generating unit 44 calculates distances Dst_2[k_2]{k_2=1 to N_2} by the same equation (2) as that of the first embodiment, using the distance-direction discrete frequencies F_2[k_2]{k_2=1 to N_2} inputted from the second peak detecting unit 43. Note, however, that in the second embodiment T_2 represents a modulation duration corresponding to substantially second-half period length of each period of the transmitted signals, and B_2 represents a modulation frequency width corresponding to substantially second-half period length of each period of the transmitted signals.

The second peak data generating unit 44 generates second peak data representing the calculated distances Dst_2[k_2]{k_2=1 to N_2} and the speed-direction discrete frequencies Fv_2[k_2]{k_2=1 to N_2} inputted from the second peak detecting unit 43. The second peak data generating unit 44 stores the second peak data in the memory 23.

Then, the speed calculating unit 50 obtains the first peak data and the second peak data from the memory 23. The speed calculating unit 50 calculates a moving speed of the radio-wave-reflecting object, using the obtained first peak data and second peak data.

Figure 13:
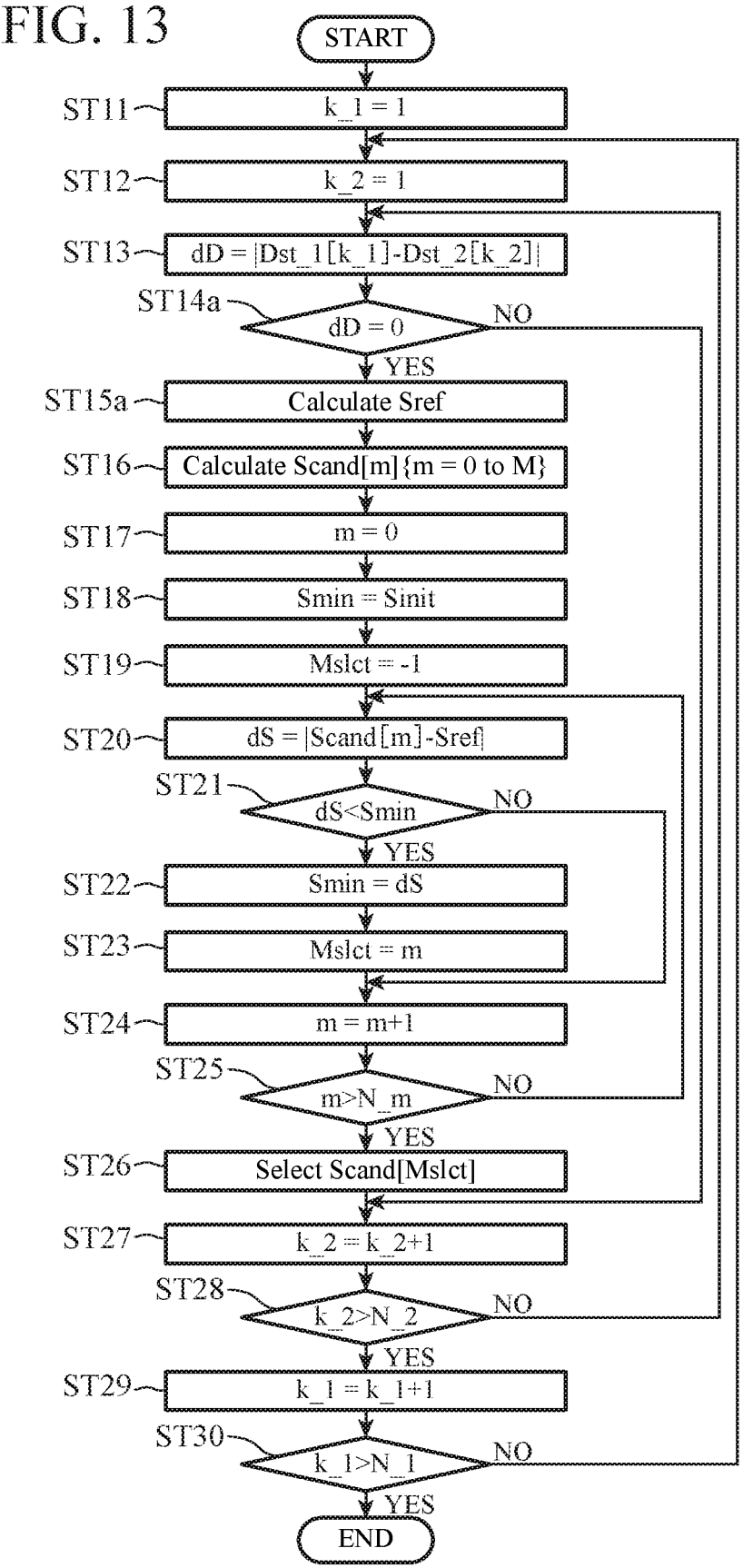
FIG. 13 is a flowchart showing the operation of a speed calculating unit according to the second embodiment of the present invention.

Next, with reference to a flowchart of FIG. 13, the details of a process performed by the speed calculating unit 50 will be described. Note that in FIG. 13 the same steps as those of the flowchart of the first embodiment shown in FIG. 7 are denoted by the same reference signs and description thereof is omitted.

First, the speed calculating unit 50 initializes the value of the counter k_1 to 1 (step ST11), initializes the value of the counter k_2 to 1 (step ST12), and calculates an absolute value dD of a difference value between a distance Dst_1 [k_1] and a distance Dst_2[k_2] (step ST13). Then, the speed calculating unit 50 proceeds to step ST14a.

At step ST14a, the speed calculating unit 50 compares the absolute value dD with 0. When the absolute value dD is 0 ("YES" at step ST14a), the speed calculating unit 50 proceeds to step ST15a. On the other hand, when the absolute value dD is a value larger than 0 or smaller than 0 ("NO" at step ST14a), the speed calculating unit 50 proceeds to step ST27.

At step ST15a, the speed calculating unit 50 calculates a reference speed Sref by the following equation (10a). Then, the speed calculating unit 50 proceeds to step ST16.

$$Sref=C\times(Fv\_2[k\_2]-Fv\_1[k\_1])/(2\times(Fc\_2-Fc\_1)) \quad (10a)$$

The contents of subsequent processes at step ST16 to ST30 are the same as those described with reference to FIG. 7 in the first embodiment, and thus, description thereof is omitted.

Note that the radar system 100a can adopt the same various variants as those of the radar system 100 according to the first embodiment. Namely, the radar signal processing device 11a may include a distance calculating unit (not shown) that calculates a distance from the radar system 100a to a radio-wave-reflecting object. The control device 12 may be integrally formed with the radar signal processing device 11a. The memory 23 may be provided external to the radar signal processing device 11a.

In addition, the meaning of the term "first-half period length" recited in the claims of the present application is not limited to complete first-half period length, and also includes substantially first-half period length such as that shown in FIG. 11A. The meaning of the term "second-half period length" recited in the claims of the present application is not limited to complete second-half period length, and also includes substantially second-half period length such as that shown in FIG. 12A.

As described above, in the second embodiment, the first voltage data $V1_1'$ to $V1_n'$ each are voltage data corresponding to first-half period length of each period of the transmitted signals $T_1$ to $T_n$, and the second voltage data $V2_1'$ to $V2_n'$ each are voltage data corresponding to second-half period length of each period of the transmitted signals $T_1$ to $T_n$. By this, in the same transmitted signals $T_1$ to $T_n$, the modulation center frequency Fc_1 and the modulation center frequency Fc_2 can have different values.

Third Embodiment

Figure 14:
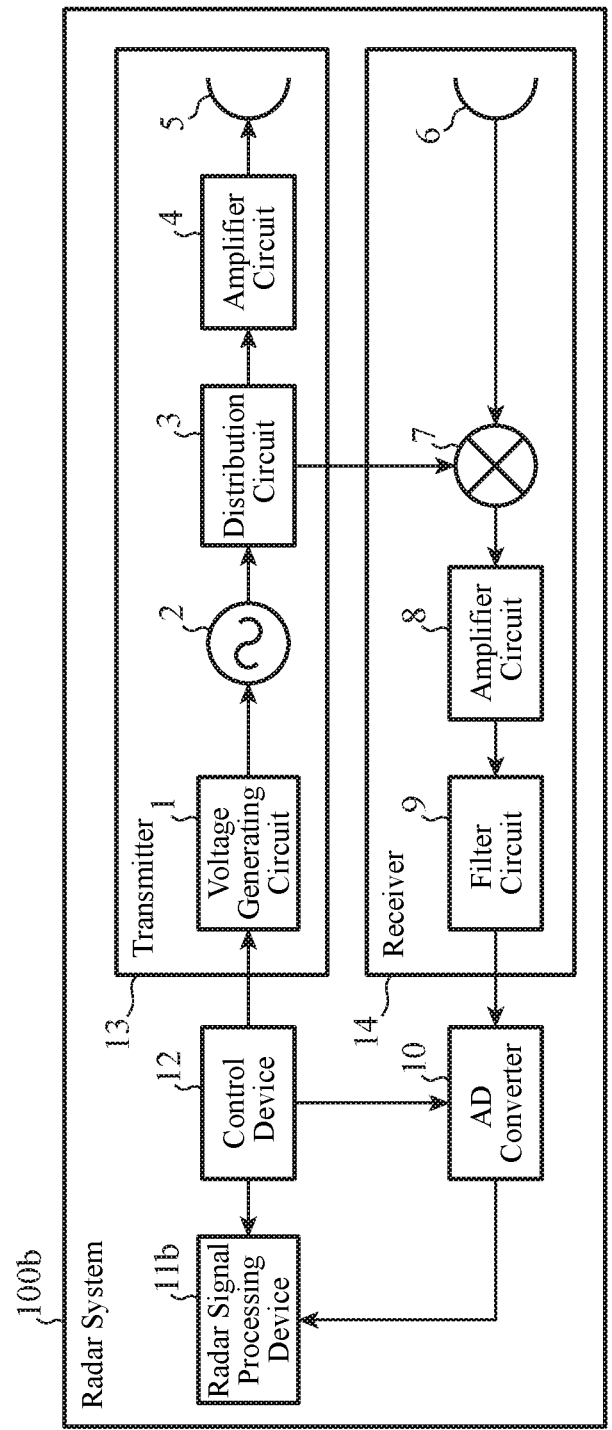
FIG. 14 is a system configuration diagram showing the main part of a radar system according to a third embodiment of the present invention.
Figure 15A:
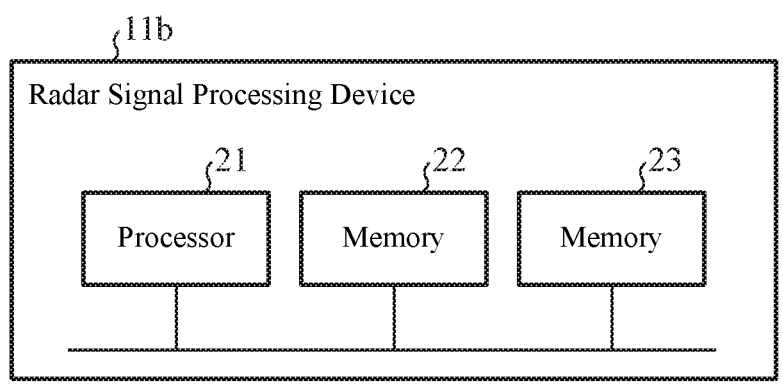
FIG. 15A is a hardware configuration diagram showing the main part of a radar signal processing device according to the third embodiment of the present invention.
Figure 15B:
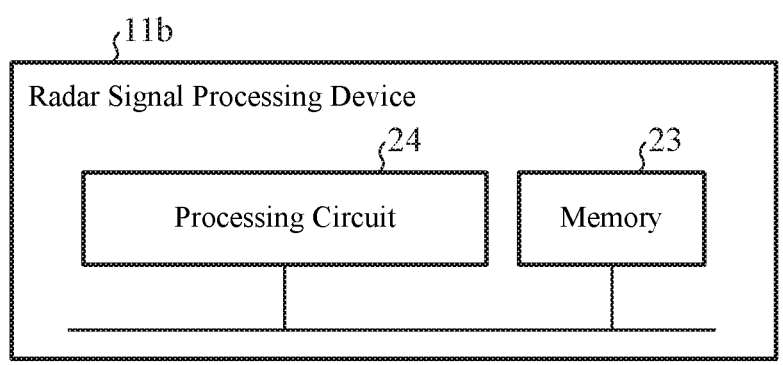
FIG. 15B is another hardware configuration diagram showing the main part of the radar signal processing device according to the third embodiment of the present invention.
Figure 16:
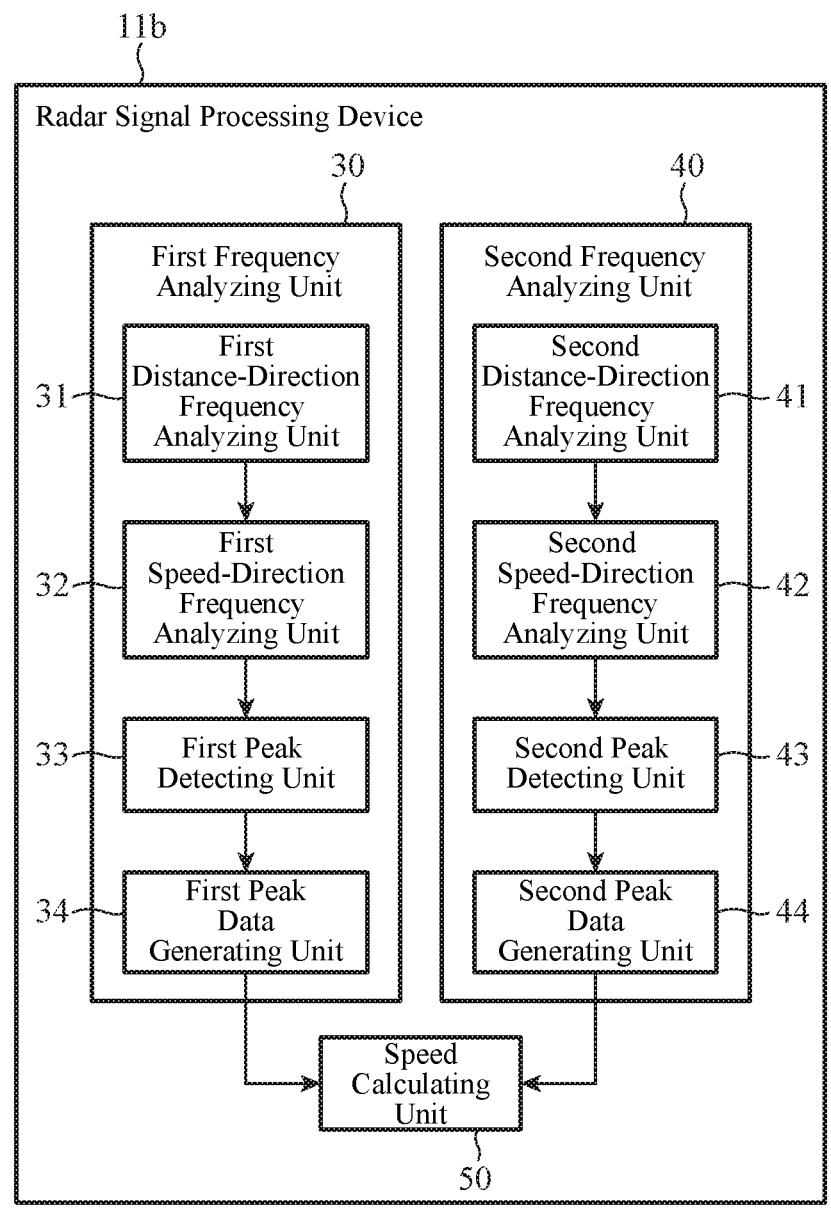
FIG. 16 is a functional block diagram showing the main part of the radar signal processing device according to the third embodiment of the present invention.

FIG. 14 is a system configuration diagram showing the main part of a radar system according to a third embodiment of the present invention. FIG. 15A is a hardware configuration diagram showing the main part of a radar signal processing device according to the third embodiment of the present invention. FIG. 15B is another hardware configuration diagram showing the main part of the radar signal processing device according to the third embodiment of the present invention. FIG. 16 is a functional block diagram showing the main part of the radar signal processing device according to the third embodiment of the present invention. With reference to FIGS. 14 to 16, a radar system 100b and a radar signal processing device 11b of the third embodiment will be described.

Note that in FIG. 14 the same blocks, etc., as those of the system configuration diagram of the first embodiment shown in FIG. 1 are denoted by the same reference signs and description thereof is omitted. In FIG. 15, the same blocks as those of the hardware configuration diagram of the first embodiment shown in FIG. 2 are denoted by the same reference signs and description thereof is omitted. In FIG. 16, the same blocks as those of the functional block diagram of the first embodiment shown in FIG. 3 are denoted by the same reference signs and description thereof is omitted.

In the third embodiment, the first distance-direction frequency analyzing unit 31 obtains voltage data corresponding to substantially one period length of each period of transmitted signals among voltage data stored in the memory 23. The second distance-direction frequency analyzing unit 41 obtains voltage data corresponding to substantially second-half period length of each period of the transmitted signals among the voltage data stored in the memory 23. By this, in the same transmitted signal, the modulation center frequency of a range corresponding to first voltage data and the modulation center frequency of a range corresponding to second voltage data have different values.

The first distance-direction frequency analyzing unit 31, the first speed-direction frequency analyzing unit 32, the first peak detecting unit 33, and the first peak data generating unit 34 form the first frequency analyzing unit 30. The second distance-direction frequency analyzing unit 41, the second speed-direction frequency analyzing unit 42, the second peak detecting unit 43, and the second peak data generating unit 44 form the second frequency analyzing unit 40. The first frequency analyzing unit 30, the second frequency analyzing unit 40, and the speed calculating unit 50 form the radar signal processing device 11b. The AD converter 10, the radar signal processing device 11b, the control device 12, the transmitter 13, and the receiver 14 form the radar system 100b.

Next, with reference to FIGS. 17 and 18, the operation of the radar signal processing device 11b will be described. Note that a flowchart is the same as that of FIG. 4 and thus a depiction thereof is omitted.

First, the first distance-direction frequency analyzing unit 31 obtains first voltage data $V1_1"$ to $V1_n"$ among voltage data stored in the memory 23. As shown in FIG. 17A, the first voltage data $V1_1"$ to $V1_n"$ each are voltage data corresponding to substantially one period length of each period of transmitted signals $T_1$ to $T_n$. The first distance-direction frequency analyzing unit 31 converts the first voltage data $V1_1"$ to $V1_n"$ into complex spectra $C1_1"$ to $C1_n"$ by distance-direction frequency analysis.

Then, the first speed-direction frequency analyzing unit 32 converts the complex spectra $C1_1"$ to $C1_n"$ into power spectra $P1_1"$ to $P1_m"$ by speed-direction frequency analysis. The first speed-direction frequency analyzing unit 32 stores the power spectra $P1_1"$ to $P1_m"$ as two-dimensional power spectra in the memory 23.

Then, the first peak detecting unit 33 obtains the two-dimensional frequency power spectra from the power spectra $P1_1"$ to $P1_m"$ from the memory 23, and detects peaks of the obtained two-dimensional frequency power spectra. The first peak detecting unit 33 outputs distance-direction discrete frequencies corresponding to the detected peaks and speed-direction discrete frequencies corresponding to the detected peaks to the first peak data generating unit 34. Here, the number of the detected peaks is N_1.

Then, the first peak data generating unit 34 calculates distances Dst_1[k_1]{k_1=1 to N_1} by the same equation (1) as that of the first embodiment, using the distance-direction discrete frequencies F_1[k_1]{k_1=1 to N_1} inputted from the first peak detecting unit 33. Note, however, that in the third embodiment T_1 represents a modulation duration corresponding to substantially one period length of each period of the transmitted signals, and B_1 represents a modulation frequency width corresponding to substantially one period length of each period of the transmitted signals.

The first peak data generating unit 34 generates first peak data representing the calculated distances Dst_1[k_1]{k_1=1 to N_1} and the speed-direction discrete frequencies Fv_1[k_1]{k_1=1 to N_1} inputted from the first peak detecting unit 33. The first peak data generating unit 34 stores the first peak data in the memory 23.

Figures 18A, 18B, 18C:
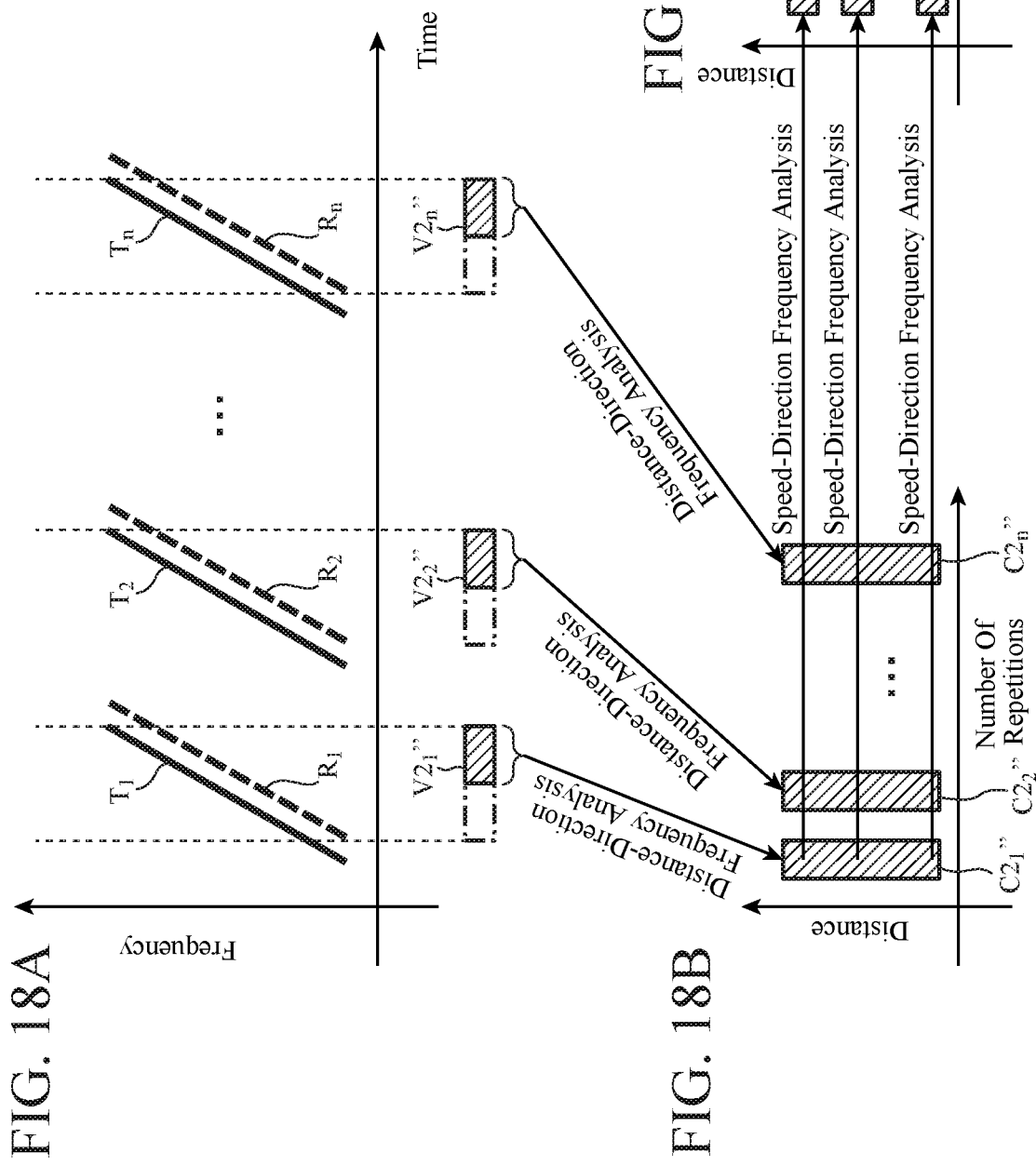
FIG. 18A is an illustrative diagram showing the waveforms of the transmitted signals, the waveforms of the received signals, and second voltage data according to the third embodiment of the present invention.
FIG. 18B is an illustrative diagram showing complex spectra into which the second voltage data shown in FIG. 18A are converted.
FIG. 18C is an illustrative diagram showing power spectra into which the complex spectra shown in FIG. 18B are converted.

In addition, the second distance-direction frequency analyzing unit 41 obtains second voltage data $V2_1"$ to $V2_n"$ among the voltage data stored in the memory 23. As shown in FIG. 18A, the second voltage data $V2_1"$ to $V2_n"$ each are voltage data corresponding to substantially second-half period length of each period of the transmitted signals $T_1$ to $T_n$. The second distance-direction frequency analyzing unit 41 converts the second voltage data $V2_1"$ to $V2_n"$ into complex spectra $C2_1"$ to $C2_n"$ by distance-direction frequency analysis.

Then, the second speed-direction frequency analyzing unit 42 converts the complex spectra $C2_1"$ to $C2_n"$ into power spectra $P2_1"$ to $P2_m"$ by speed-direction frequency analysis. The second speed-direction frequency analyzing unit 42 stores the power spectra $P2_1"$ to $P2_m"$ as two-dimensional power spectra in the memory 23.

Then, the second peak detecting unit 43 obtains the two-dimensional frequency power spectra from the power spectra $P2_1"$ to $P2_m"$ from the memory 23, and detects peaks of the obtained two-dimensional frequency power spectra. The second peak detecting unit 43 outputs distance-direction discrete frequencies corresponding to the detected peaks and speed-direction discrete frequencies corresponding to the detected peaks to the second peak data generating unit 44. Here, the number of the detected peaks is N_2.

Then, the second peak data generating unit 44 calculates distances Dst_2[k_2]{k_2=1 to N_2} by the same equation (2) as that of the first embodiment, using the distance-direction discrete frequencies F_2[k_2]{k_2=1 to N_2} inputted from the second peak detecting unit 43. Note, however, that in the third embodiment T_2 represents a modulation duration corresponding to substantially second-half period length of each period of the transmitted signals, and B_2 represents a modulation frequency width corresponding to substantially second-half period length of each period of the transmitted signals.

The second peak data generating unit 44 generates second peak data representing the calculated distances Dst_2[k_2]{k_2=1 to N_2} and the speed-direction discrete frequencies Fv_2[k_2]{k_2=1 to N_2} inputted from the second peak detecting unit 43. The second peak data generating unit 44 stores the second peak data in the memory 23.

Then, the speed calculating unit 50 obtains the first peak data and the second peak data from the memory 23. The speed calculating unit 50 calculates a moving speed of the radio-wave-reflecting object, using the obtained first peak data and second peak data.

The details of the process performed by the speed calculating unit 50 are the same as those described with reference to FIG. 7 in the first embodiment, and thus, the depiction and description thereof are omitted. Note, however, that at step ST15 the speed calculating unit 50 calculates a reference speed Sref by the following equation (10b).

$$Sref = C \times (Fv\_2[k\_2] - Fv\_1[k\_1])/(2 \times (Fc\_2 - Fc\_1)) \quad (10b)$$

Note that the radar system 100b can adopt the same various variants as those of the radar system 100 according to the first embodiment. Namely, the radar signal processing device 11b may include a distance calculating unit (not shown) that calculates a distance from the radar system 100b to a radio-wave-reflecting object. The control device 12 may be integrally formed with the radar signal processing device 11b. The memory 23 may be provided external to the radar signal processing device 11b.

In addition, the meaning of the term "one period length" recited in the claims of the present application is not limited to complete one period length, and also includes substantially one period length such as that shown in FIG. 17A. The meaning of the term "second-half period length" recited in the claims of the present application is not limited to complete second-half period length, and also includes substantially second-half period length such as that shown in FIG. 18A.

As described above, in the third embodiment, the first voltage data $V1_1"$ to $V1_n"$ each are voltage data corresponding to one period length of each period of the transmitted signals $T_1$ to $T_n$, and the second voltage data $V2_1"$ to $V2_n"$ each are voltage data corresponding to second-half period length of each period of the transmitted signals $T_1$ to $T_n$. By this, in the same transmitted signals $T_1$ to $T_n$, the modulation center frequency Fc_1 and the modulation center frequency Fc_2 can have different values.

Note that in the invention of the present application, a free combination of the embodiments, modifications to any component of the embodiments, or omissions of any component in the embodiments are possible within the scope of the invention.

INDUSTRIAL APPLICABILITY

The radar signal processing devices of the present invention can be used, for example, in a marine, ground, or in-vehicle radar.

REFERENCE SIGNS LIST

1: Voltage generating circuit, 2: Voltage controlled oscillator, 3: Distribution circuit, 4: Amplifier circuit, 5: Antenna, 6: Antenna, 7: Mixer, 8: Amplifier circuit, 9: Filter circuit, 10: Analog-digital converter (AD converter), 11, 11a, and 11b: Radar signal processing device, 12: Control device, 13: Transmitter, 14: Receiver, 21: Processor, 22 and 23: Memory, 24: Processing circuit, 30: First frequency analyzing unit, 31: First distance-direction frequency analyzing unit, 32: First speed-direction frequency analyzing unit, 33: First peak detecting unit, 34: First peak data generating unit, 40: Second frequency analyzing unit, 41: Second distance-direction frequency analyzing unit, 42: Second speed-direction frequency analyzing unit, 43: Second peak detecting unit, 44: Second peak data generating unit, 50: Speed calculating unit, and 100, 100a, and 100b: Radar system.

The invention claimed is:

1. A radar signal processing device that measures a moving speed of an object using voltage data obtained by mixing transmitted signals with received signals, the transmitted signals being chirp signals, the received signals corresponding to reflected waves of radio waves corresponding to the transmitted signals, and the object having reflected the radio waves, the radar signal processing device comprising:
   a processor; and
   a memory storing instructions, upon executed by the processor, causing the processor to perform a process of:
   performing frequency analysis on first voltage data among the voltage data;
   for performing frequency analysis on second voltage data among the voltage data; and
   calculating the moving speed of the object using results of the frequency analysis performed by the process on the first voltage data and results of the frequency analysis performed by the process on the second voltage data, wherein
   the first voltage data and the second voltage data each correspond to ranges of each transmitted signal that have different modulation center frequencies, and
   the process calculates the moving speed of the object by calculating a reference speed and comparing a plurality of speed candidates with the reference speed, the reference speed being based on a difference value between the modulation center frequency of the range corresponding to the first voltage data and the modulation center frequency of the range corresponding to the second voltage data.

2. The radar signal processing device according to claim 1, wherein the process selects, as the moving speed of the object, a speed candidate closer to the reference speed than other speed candidates among the plurality of speed candidates.

3. The radar signal processing device according to claim 2, wherein the process selects, as the moving speed of the object, a speed candidate closest to the reference speed among the plurality of speed candidates.

4. The radar signal processing device according to claim 1, wherein
   the frequency analysis performed by each of the process on the first voltage data and the process on the second voltage data includes distance-direction frequency analysis that converts the voltage data into frequency complex spectra, and speed-direction frequency analysis that converts the frequency complex spectra into two-dimensional frequency power spectra, and
   the speed-direction frequency analysis adds zero-value data to a tail end of data to be converted, and performs frequency analysis on the data added with the zero-value data.

5. The radar signal processing device according to claim 1, wherein
   the first voltage data is voltage data corresponding to one period length of each period of the transmitted signals, and
   the second voltage data is voltage data corresponding to first-half period length of each period of the transmitted signals.

6. The radar signal processing device according to claim 1, wherein
   the first voltage data is voltage data corresponding to one period length of each period of the transmitted signals, and
   the second voltage data is voltage data corresponding to second-half period length of each period of the transmitted signals.

7. The radar signal processing device according to claim 1, wherein
   the first voltage data is voltage data corresponding to first-half period length of each period of the transmitted signals, and
   the second voltage data is voltage data corresponding to second-half period length of each period of the transmitted signals.

8. A radar system including a transmitter that generates transmitted signals and radiates radio waves corresponding to the transmitted signals, the transmitted signals being chirp signals; a receiver that receives reflected waves of the radio waves; and a radar signal processing device that measures a moving speed of an object having reflected the radio waves, using voltage data obtained by mixing the transmitted signals with received signals corresponding to the reflected waves, wherein
   the radar signal processing device includes:
   a processor; and
   a memory storing instructions, upon executed by the processor, causing the processor to perform a process of:
   performing frequency analysis on first voltage data among the voltage data;
   performing frequency analysis on second voltage data among the voltage data; and
   calculating the moving speed of the object using results of the frequency analysis performed by the process on the first voltage data and results of the frequency analysis performed by the process on the second voltage data,
   the first voltage data and the second voltage data each correspond to ranges of each transmitted signal that have different modulation center frequencies, and the process calculates the moving speed of the object by calculating a reference speed and comparing a plurality of speed candidates with the reference speed, the reference speed being based on a difference value between the modulation center frequency of the range corresponding to the first voltage data and the modulation center frequency of the range corresponding to the second voltage data.

* * * * *